(12) United States Patent
Mildh

(10) Patent No.: US 12,256,370 B2
(45) Date of Patent: Mar. 18, 2025

(54) UE FREQUENCY SELECTION AND PRIORITIZATION BASED ON NETWORK SLICE INFORMATION

(71) Applicant: Telefonaktiebolaget LM Ericsson (publ), Stockholm (SE)

(72) Inventor: Gunnar Mildh, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 298 days.

(21) Appl. No.: 17/628,366

(22) PCT Filed: Sep. 10, 2020

(86) PCT No.: PCT/SE2020/050849
§ 371 (c)(1),
(2) Date: Jan. 19, 2022

(87) PCT Pub. No.: WO2021/049993
PCT Pub. Date: Mar. 18, 2021

(65) Prior Publication Data
US 2022/0287036 A1   Sep. 8, 2022

Related U.S. Application Data

(60) Provisional application No. 62/900,178, filed on Sep. 13, 2019.

(51) Int. Cl.
*H04W 72/04* (2023.01)
*H04W 72/0453* (2023.01)
(Continued)

(52) U.S. Cl.
CPC ....... *H04W 72/0453* (2013.01); *H04W 72/56* (2023.01); *H04W 74/0833* (2013.01);
(Continued)

(58) Field of Classification Search
CPC ..... H04W 36/08; H04W 48/16; H04W 48/20; H04W 72/0453; H04W 72/56; H04W 74/0833; H04W 80/10
See application file for complete search history.

(56) References Cited

U.S. PATENT DOCUMENTS 10,736,028 B2 *   8/2020   Griot ............... H04W 48/18
10,892,945 B2 *   1/2021   Miklós ............. H04L 41/0823
(Continued)

FOREIGN PATENT DOCUMENTS

WO   WO-2017140342 A1 *   8/2017   ............ H04W 48/20
WO   2018228294 A1       12/2018
(Continued)

OTHER PUBLICATIONS

Zhu et al. U.S. Appl. No. 62/880,531, filed Jul. 30, 2019 (Year: 2019).*

(Continued)

*Primary Examiner* — Wutchung Chu
(74) *Attorney, Agent, or Firm* — Weisberg I.P. Law, P.A.

(57) ABSTRACT

Embodiments include methods for a user equipment (UE) operating in a radio access network (RAN) coupled to a core network (CN). Such methods include receiving, from the RAN or the CN, one or more frequency selection policy parameters (P) related to a protocol data unit (PDU) 5 session for the UE and/or a network slice associated with a PDU session for the UE. Such methods also include, based on the frequency selection policy parameters, determining one or more preferred frequencies or frequency layers for one or more mobility operations. Such methods also include performing a first one of the mobility operations on a first one of the determined preferred frequencies or frequency layers. Other embodiments include complementary methods (Continued)

for a 0 wireless network, and UEs and wireless networks configured to perform such methods.

22 Claims, 13 Drawing Sheets

(51) Int. Cl.
*H04W 72/56* (2023.01)
*H04W 74/0833* (2024.01)
*H04W 36/00* (2009.01)
*H04W 36/08* (2009.01)
*H04W 80/10* (2009.01)

(52) U.S. Cl.
CPC ............ *H04W 36/08* (2013.01); *H04W 36/13* (2023.05); *H04W 80/10* (2013.01)

(56) References Cited

U.S. PATENT DOCUMENTS

| | | | | |
|---|---|---|---|---|
| 11,057,962 | B2* | 7/2021 | Iskander | H04W 76/27 |
| 11,265,808 | B2* | 3/2022 | Wang | H04W 24/08 |
| 11,343,868 | B2* | 5/2022 | Richards | H04L 5/001 |
| 11,356,940 | B2* | 6/2022 | Zhu | H04W 76/27 |
| 2006/0023664 | A1* | 2/2006 | Jeong | H04W 36/0007 370/329 |
| 2018/0270744 | A1* | 9/2018 | Griot | H04W 88/18 |
| 2018/0288734 | A1 | 10/2018 | Islam et al. | |
| 2019/0268819 | A1* | 8/2019 | Kim | H04W 24/10 |
| 2020/0008070 | A1* | 1/2020 | Furuichi | H04W 24/10 |
| 2020/0120547 | A1* | 4/2020 | Han | H04W 36/0083 |
| 2020/0314851 | A1* | 10/2020 | Vaidya | H04L 1/0061 |
| 2021/0037455 | A1* | 2/2021 | Zhu | H04W 76/27 |
| 2022/0039002 | A1* | 2/2022 | Corston-Petrie | H04W 60/04 |
| 2022/0070766 | A1* | 3/2022 | Haque | H04W 48/18 |
| 2022/0110152 | A1* | 4/2022 | Lim | H04W 74/006 |
| 2022/0210726 | A1* | 6/2022 | Sillanpaa | H04W 48/18 |
| 2022/0287036 | A1* | 9/2022 | Mildh | H04W 74/0833 |
| 2022/0369215 | A1* | 11/2022 | Dees | H04W 76/14 |
| 2024/0007902 | A1* | 1/2024 | Liao | H04W 28/088 |

FOREIGN PATENT DOCUMENTS

| | | | | |
|---|---|---|---|---|
| WO | 2019074430 A1 | 4/2019 | | |
| WO | WO-2021021580 A1 * | 2/2021 | ............ | H04W 36/13 |

OTHER PUBLICATIONS

"Email discussion for R17 proposals on slicing", 3GPP TSG RAN Meeting #85, RP-191778, Newport Beach, USA, Sep. 16-20, 2019, pp. 1-43.

"3GPP TS 38.401 V15.6.0", 3rd Generation Partnership Project; Technical Specification Group Radio Access Network; NG-RAN; Architecture description (Release 15), Jul. 2019, pp. 1-46.

"3GPP TS 33.401 V15.8.0", 3rd Generation Partnership Project; Technical Specification Group Services and System Aspects; 3GPP System Architecture Evolution (SAE); Security architecture (Release 15), Jun. 2019, pp. 1-163.

"3GPP TR 23.799 V14.0.0", 3rd Generation Partnership Project; Technical Specification Group Services and System Aspects; Study on Architecture for Next Generation System (Release 14), Dec. 2016, pp. 1-522.

"3GPP TS 23.501 V16.1.0", 3rd Generation Partnership Project; Technical Specification Group Services and System Aspects; System Architecture for the 5G System; Stage 2 (Release 16), Jun. 2019, pp. 1-368.

Unknown , "3GPP TR 38.801 V2.0.0", 3rd Generation Partnership Project; Technical Specification Group Radio Access Network; Study on New Radio Access Technology; Radio Access Architecture and Interfaces (Release 14), Mar. 2017, pp. 1-90.

* cited by examiner

Fig. 6A

| Step | Description | |
|---|---|---|
| 680 | Performing a first one of the mobility operations on a first one of the determined preferred frequencies or frequency layers. | |
| 681 | While camping on a first cell at a first frequency that is different than the first preferred frequency, scanning for any cells at the first preferred frequency. | |
| 682 | Upon identifying a second cell at the first preferred frequency or frequency layer, performing a cell reselection to the second cell. | |
| 683 | Accessing the cell by sending a random access message on the selected second preferred frequency layer. | |
| 684 | Performing cell reselection to the particular cell when the signal quality of the particular cell is greater than or equal to a threshold. | |
| 685 | When the signal quality of the particular cell is less than the threshold, performing cell reselection to a further cell that broadcasts a third index value that does not match the first index value. | |
| 686 | Deactivating a network slice associated with the first index value. | |
| 687 | Performing a re-registration procedure with the CN. | |
| 688 | Accessing the cell by sending a random access message on the second preferred frequency. | |

FIG. 6B

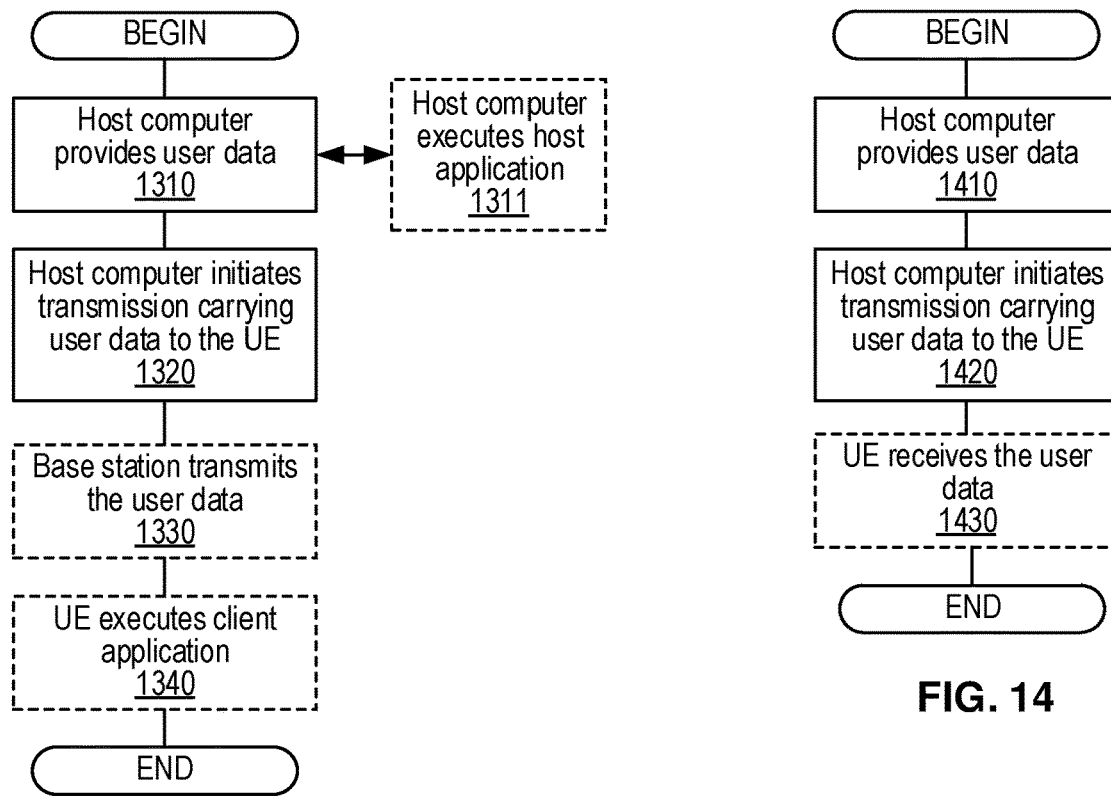
FIG. 13
FIG. 14
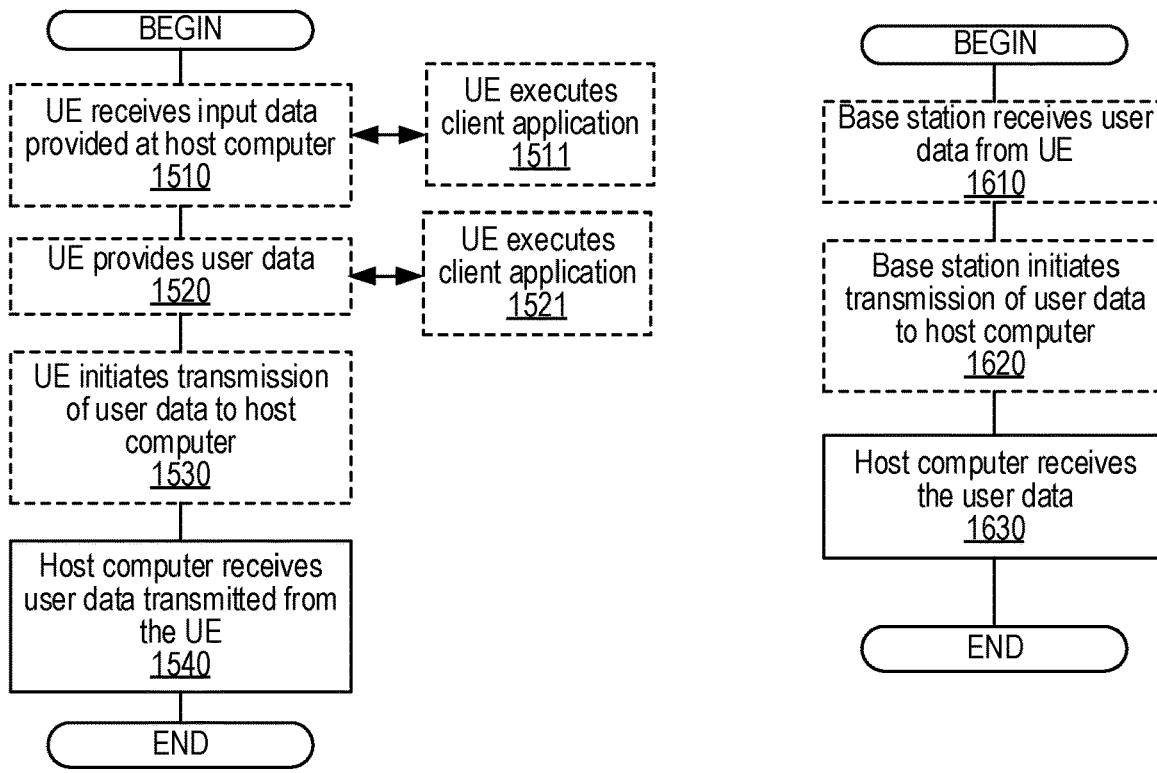
FIG. 15
FIG. 16

UE FREQUENCY SELECTION AND PRIORITIZATION BASED ON NETWORK SLICE INFORMATION

TECHNICAL FIELD

The present application relates generally to the field of wireless communication networks, and more specifically to more efficient ways for user equipment (UEs) to select resources in wireless networks having functionality partitioned into slices.

BACKGROUND

Currently the fifth generation ("5G") of cellular systems, also referred to as New Radio (NR), is being standardized within the Third-Generation Partnership Project (3GPP). NR is developed for maximum flexibility to support many different use cases. These include enhanced mobile broadband (eMBB), machine type communication (MTC), ultra-reliable low-latency communications (URLLC), side-link device-to-device (D2D), and several other use cases. The present disclosure relates generally to NR, but the following description of previous-generation technology is provided for context since it shares many features with NR.

Long Term Evolution (LTE) is an umbrella term for so-called fourth-generation (4G) radio access technologies developed within the Third-Generation Partnership Project (3GPP) and initially standardized in Releases 8 and 9, also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network.

LTE continues to evolve through subsequent releases. A feature added in Release 10 (Rel-10) is support for bandwidths larger than 20 MHz, while remaining backward compatible with Rel-8. As such, a wideband (e.g., >20 MHz) LTE Rel-10 carrier should appear as a number of component carriers (CCs) to an LTE Rel-8 terminal. For an efficient use of a wideband Rel-10 carrier, legacy (e.g., Rel-8) terminals can be scheduled in all parts of the wideband LTE Rel-10 carrier. One way to achieve this is by means of Carrier Aggregation (CA), whereby an LTE Rel-10 UE can receive multiple CCs, each preferably having the same structure as a Rel-8 carrier.

Each of the CCs allocated to a UE can also correspond to a cell. In particular, the UE is assigned a primary serving cell (PCell) as the "main" cell serving the UE. Both data and control signaling can be transmitted over the PCell, which is always activated. In addition, the UE can be assigned one or more supplementary or secondary serving cells (SCells) that are typically used for transmitting data only. For example, the SCell(s) can provide extra bandwidth to enable greater data throughput and can be activated or deactivated dynamically.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs (e.g., UE 120) in uplink and downlink, as well as security of the communications with UEs. These functions reside in the eNBs, such as eNBs 105, 110, and 115. Each of the eNBs can serve a geographic coverage area including one more cells, including cells 106, 111, and 116 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. Generally speaking, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The SGW handles all Internet Protocol (IP) data packets (e.g., data or user plane) between the UE and the EPC and serves as the local mobility anchor for the data bearers when UE 120 moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MME/S-GWs 134 and 138 via respective S6a interfaces.

In some embodiments, HSS 131 can communicate with a user data repository (UDR)—labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

The Radio Resource Control (RRC) protocol layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE's radio is active on a discontinuous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel on PDCCH for pages from the EPC via eNB. A UE in RRC_IDLE state is known in the EPC and has an assigned IP address, but is not known to the serving eNB (e.g., there is no stored context).

Fifth-generation NR technology shares many similarities with fourth-generation LTE. For example, NR uses CP- OFDM (Cyclic Prefix Orthogonal Frequency Division Multiplexing) in the DL and both CP-OFDM and DFT-spread OFDM (DFT-S-OFDM) in the UL. As another example, in the time domain, NR DL and UL physical resources are organized into equal-sized 1-ms subframes. A subframe is further divided into multiple slots of equal duration, with each slot including multiple OFDM-based symbols. As another example, in addition to RRC_IDLE and RRC_CONNECTED states, the NR RRC layer also includes an RRC_INACTIVE that has some properties similar to a "suspended" condition defined for LTE.

In addition to providing coverage via cells, as in LTE, NR networks also provide coverage via "beams." In general, a DL "beam" is a coverage area of a network-transmitted reference signal (RS) that may be measured or monitored by a UE. In NR, for example, such RS can include any of the following, alone or in combination: SS/PBCH block (SSB), CSI-RS, tertiary reference signals (or any other sync signal), positioning RS (PRS), demodulation RS (DMRS), phase-tracking RS (PTRS), etc. In general, SSB is available to all UEs regardless of RRC state, while other RS (e.g., CSI-RS, DMRS, PTRS) are associated with specific UEs that are in RRC_CONNECTED state.

As briefly mentioned above, 5G/NR radio standards are currently targeting a wide range of data services including eMBB and URLLC. These services can have different requirements and objectives. For example, URLLC is intended to provide a data service with extremely strict error and latency requirements, e.g., error probabilities as low as $10^{-5}$ or lower and 1 ms end-to-end latency or lower. For eMBB, the requirements on latency and error probability can be less stringent whereas the required supported peak rate and/or spectral efficiency can be higher.

Support for network slicing was introduced in 3GPP Release 15 as part of 5G NR standardization and 5G Core Network (CN) standardization, although certain slicing mechanisms are also available in 4G E-UTRAN/EPC. Network slicing allows the operator to partition their network into different logical end-to-end slices of functionality that minimize impact between groups of users sharing a pool of network resources (e.g., radio resources). For example, slicing can be applied to functionality in the NGRAN and/or the 5GC. Each slice can have a different configuration in terms of protocols, resource usage policies, access criteria, performance, etc. Different slices can also be realized with independent logical or physical instances of the various network functions. For example, it is possible to use a dedicated CN instance for each slice.

Various enhancements to the handling of network slicing in policies for UE radio access technology (RAT) and frequency selection priority (RFSP) are being considered in ongoing NR Rel-17 standardization. While these enhancements may provide various advantages to UEs and networks, they also creates various problems, issues, and/or drawbacks that should be addressed.

SUMMARY

Accordingly, exemplary embodiments of the present disclosure address these and other problems, issues, and/or drawbacks related to UEs operating in networks that employ slicing and/or partitioning of network functionality.

Such embodiments can include methods (e.g., procedures) for a user equipment (UE) operating in a radio access network (RAN) coupled to a core network (CN), the RAN comprising a plurality of cells. These exemplary methods can include receiving, from the RAN or the CN, one or more frequency selection policy parameters (e.g., P) related to at least one of the following: a protocol data unit (PDU) session for the UE, and a network slice associated with a PDU session for the UE. These exemplary methods can also include, based on the frequency selection policy parameters, determining one or more preferred frequencies or frequency layers for one or more mobility operations. These exemplary methods can also include performing a first one of the mobility operations on a first one of the determined preferred frequencies or frequency layers.

In various embodiments, the mobility operations can include any of the following:
  camping on at least one of a cell and a frequency layer;
  accessing at least one of a cell and a frequency layer for data or signaling associated with the PDU session or the network slice;
  monitoring a cell; and
  performing a cell reselection.

In some embodiments, the frequency selection policy parameters can include a first plurality of frequencies or frequency layers that are preferred for at least one of the mobility operations and a corresponding first plurality of priorities associated with the respective preferred frequencies or frequency layers. In other embodiments, the frequency selection policy parameters can include an index value associated with a first one of the mobility operations and a preferred frequency or frequency layer associated with a second one of the mobility operations.

In some embodiments, the frequency selection policy parameters can include a first preferred frequency for camping on a cell. In some of these embodiments, the performing operations can include scanning for any cells at the first preferred frequency while camping on a first cell at a first frequency that is different than the first preferred frequency, and upon identifying a second cell at the first preferred frequency or frequency layer, performing a cell reselection to the second cell.

In other of these embodiments, the frequency selection policy parameters can also include a plurality of second preferred frequency layers for accessing the cell, with each second preferred frequency layer being related to a different network slice. In such embodiments, these exemplary methods can also include receiving a paging message indicating availability of DL data associated with a particular network slice while camping on the first preferred frequency layer in the cell. In such embodiments, the determining operations can include selecting one of the second preferred frequency layers that is related to the particular network slice. Also, the performing operations can include accessing the cell by sending a random access message on the selected second preferred frequency layer.

In some embodiments, the frequency selection policy parameters can include a first index value. In such embodiments, the determining operations can include receiving a second index value broadcast in a particular cell on a particular frequency, and determining that the particular frequency is a preferred frequency based on determining that the second index value matches the first index value.

In some of these embodiments, the performing operations can include performing cell reselection to the particular cell when the signal quality of the particular cell is greater than or equal to a threshold and, when the signal quality of the particular cell is less than the threshold, performing cell reselection to a further cell that broadcasts a third index value that does not match the first index value. In some embodiments, the performing operations can also include, when the signal quality of the particular cell is less than the threshold, deactivating a network slice associated with the first index value and/or performing a re-registration procedure with the CN.

In some embodiments, the one or more frequency selection policy parameters can include a first preferred frequency for camping on a cell in relation to an enhanced mobile broadband (eMBB) PDU session, and a second preferred frequency for accessing the cell in relation to an ultra-reliable low-latency communication (URLLC) PDU session. In such embodiments, these exemplary methods can also include detecting arrival of UL data associated with the URLLC PDU session while camping on the first preferred frequency in the cell. In such embodiments, the performing operations can include accessing the cell by sending a random access message on the second preferred frequency.

In various embodiments, the frequency selection policy parameters can be received in any of the following ways:
- from the RAN in association with a configuration of a data radio bearer (DRB) related to the PDU session and/or the network slice;
- from the RAN together with an indication of the related PDU session and/or the related network slice;
- from the CN, via the RAN, during establishment of the related PDU session; or
- from the CN, via the RAN, during a re-registration procedure.

In some embodiments, these exemplary methods can also include selecting a particular cell, from among a plurality of available cells, based on the particular cell supporting at least one of the preferred frequencies or frequency layers. The selected particular cell can then be used for various operations, such as those summarized above.

In some embodiments, these exemplary methods can also include sending, to the CN or the RAN, a first indication that the UE supports slice-specific or PDU session-specific frequency selection policies. In some embodiments, the frequency selection policy parameters (P) can be received in response to the first indication. In some embodiments, these exemplary methods can also include receiving (e.g., from the CN or the RAN) a second indication that the RAN supports slice-specific or PDU session-specific frequency selection policies. In some embodiments, the first indication can be sent in response to the second indication.

Other embodiments include methods (e.g., procedures) for a wireless network that includes a RAN coupled to a CN. For example, these exemplary methods can be performed by one or more nodes (e.g., CN nodes and/or RAN nodes) of the network.

These exemplary methods can include determining, for a user equipment (UE), one or more frequency selection policy parameters related to one or more mobility operations. The frequency selection policy parameters can be further related to a protocol data unit (PDU) session for the UE, and/or a network slice associated with a PDU session for the UE. These exemplary methods can also include sending the frequency selection policy parameters to the UE.

In various embodiments, the mobility operations can have any of the characteristics summarized above in relation to UE embodiments. In various embodiments, the frequency selection policy parameters can be sent to the UE in any of the ways summarized above in relation to UE embodiments.

In some embodiments, the frequency selection policy parameters can include a first plurality of frequencies or frequency layers that are preferred for at least one of the mobility operations and a corresponding first plurality of priorities associated with the respective preferred frequencies or frequency layers. In other embodiments, the frequency selection policy parameters can include an index value associated with a first one of the mobility operations and a preferred frequency or frequency layer associated with a second one of the mobility operations.

In some embodiments, the frequency selection policy parameters can include a first preferred frequency for camping on a cell. In some of these embodiments, the frequency selection policy parameters can also include a plurality of second preferred frequency layers for accessing the cell, with each second preferred frequency layer being related to a different network slice. In such embodiments, these exemplary methods can also sending, to the UE on the first preferred frequency, a paging message indicating availability of downlink (DL) data associated with a particular network slice; and receiving, from the UE, a random access message on one of the second preferred frequency layers that is related to the particular network slice.

In some embodiments, the frequency selection policy parameters can include a first index value. In such embodiments, these exemplary methods can also include broadcasting, in a plurality of cells, respective index values indicating preferred frequencies associated with the respective cells. The first index value can be broadcast in at least one of the cells.

In some embodiments, the one or more frequency selection policy parameters can include a first preferred frequency for camping on a cell in relation to an enhanced mobile broadband (eMBB) PDU session, and a second preferred frequency for accessing the cell in relation to an ultra-reliable low-latency communication (URLLC) PDU session. In such embodiments, these exemplary methods can also include receiving, from the UE, a random access message on the second preferred frequency.

In some embodiments, these exemplary methods can also include receiving, from the UE, a first indication that the UE supports slice-specific or PDU session-specific frequency selection policies. In some embodiments, the frequency selection policy parameters can be sent in response to the first indication. In some embodiments, these exemplary methods can also include sending, to the UE, a second indication that the RAN supports slice-specific or PDU session-specific frequency selection policies. In some embodiments, the first indication can be received in response to the second indication.

Other embodiments include user equipment (UEs, e.g., wireless devices) and wireless networks (e.g., various nodes and/or components in a RAN and/or a CN) configured to perform operations corresponding to any of the exemplary methods described herein. Other embodiments include non-transitory, computer-readable media storing computer-executable instructions that, when executed by a processing circuitry of a UE or one or more network nodes, configure the UE or the wireless network node to perform operations corresponding to any of the exemplary methods described herein.

These and other objects, features, and advantages of embodiments of the present disclosure will become apparent upon reading the following Detailed Description in view of the Drawings briefly described below.

BRIEF DESCRIPTION OF THE DRAWINGS

FIG. 6, which includes FIGS. 6A-B, shows an exemplary method (e.g., procedure) for a user equipment (UE, e.g., wireless device), according to various exemplary embodiments of the present disclosure.

FIG. 13-16 are flow diagrams illustrating various exemplary methods (e.g., procedures) implemented in a communication system, according to various exemplary embodiments of the present disclosure.

DETAILED DESCRIPTION

Figure 1:
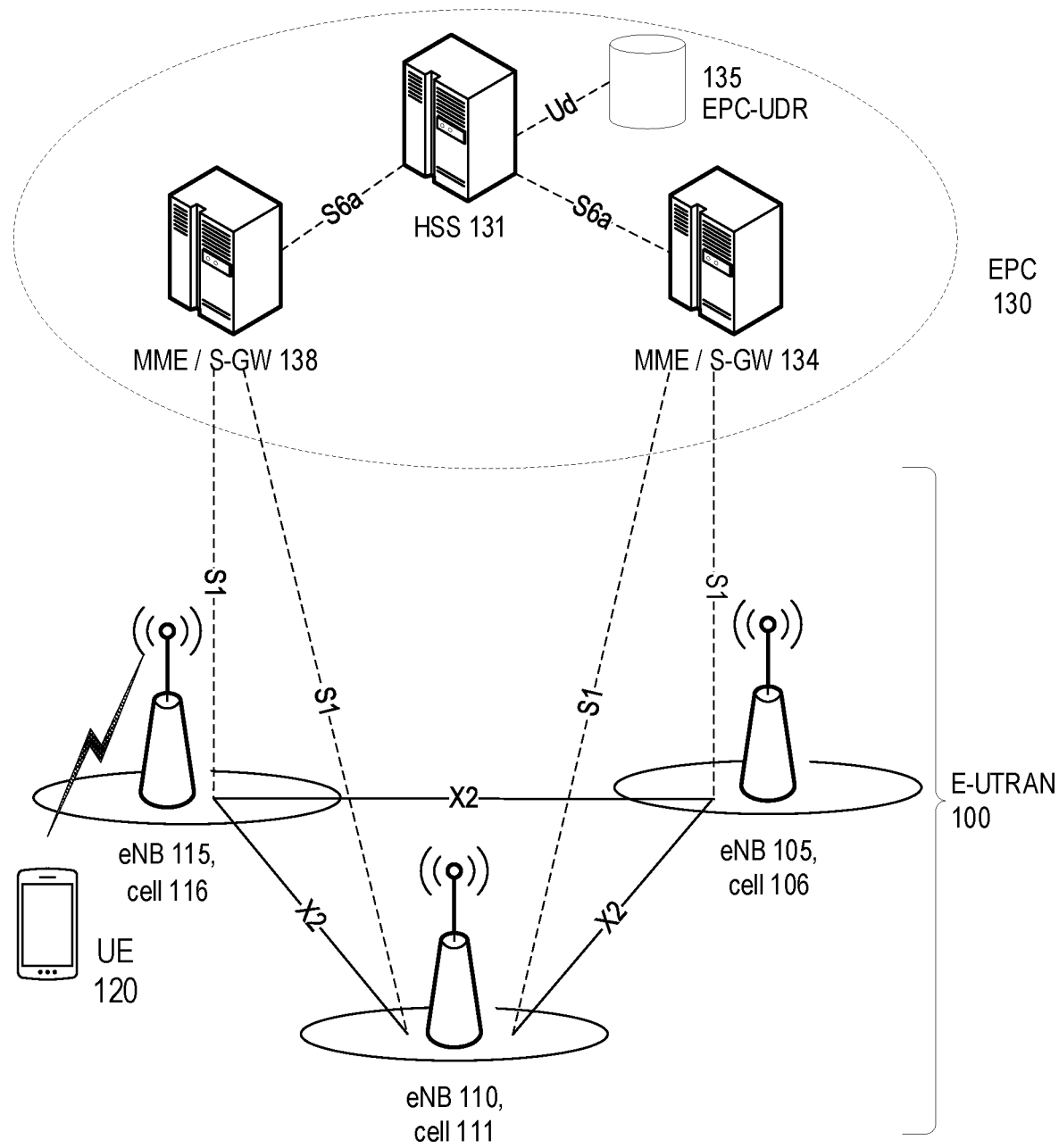
FIG. 1 is a high-level block diagram of an exemplary architecture of the Long-Term Evolution (LTE) Evolved UTRAN (E-UTRAN) and Evolved Packet Core (EPC) network.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods and/or procedures disclosed herein do not have to be performed in the exact order disclosed, unless a step is explicitly described as following or preceding another step and/or where it is implicit that a step must follow or precede another step. Any feature of any of the embodiments disclosed herein can be applied to any other embodiment, wherever appropriate. Likewise, any advantage of any of the embodiments can apply to any other embodiments, and vice versa. Other objectives, features and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB) in a 3GPP Fifth Generation (5G) NR network or an enhanced or evolved Node B (eNB) in a 3GPP LTE network), base station distributed components (e.g., CU and DU), a high-power or macro base station, a low-power base station (e.g., micro, pico, femto, or home base station, or the like), an integrated access backhaul (IAB) node, a transmission point, a remote radio unit (RRU or RRH), a relay node, a communications satellite, and an earth gateway for satellites.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (SMF), a user plane function (UPF), a network exposure function (NEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, D2D UEs, V2X UEs, etc. Unless otherwise noted, the term "wireless device" is used interchangeably herein with the term "user equipment" (or "UE" for short).

Network Node: As used herein, a "network node" is any node that is either part of the radio access network or the core network of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, various enhancements to the handling of network slicing in UE radio access technology (RAT) and frequency selection priority (RFSP) policy are being considered in ongoing NR Rel-17 standardization. While these enhancements may provide various advantages to UEs and networks, they also creates various problems, issues, and/or drawbacks that should be addressed. This is discussed in more detail after the following description of 5G/NR network architecture.

Figure 2:
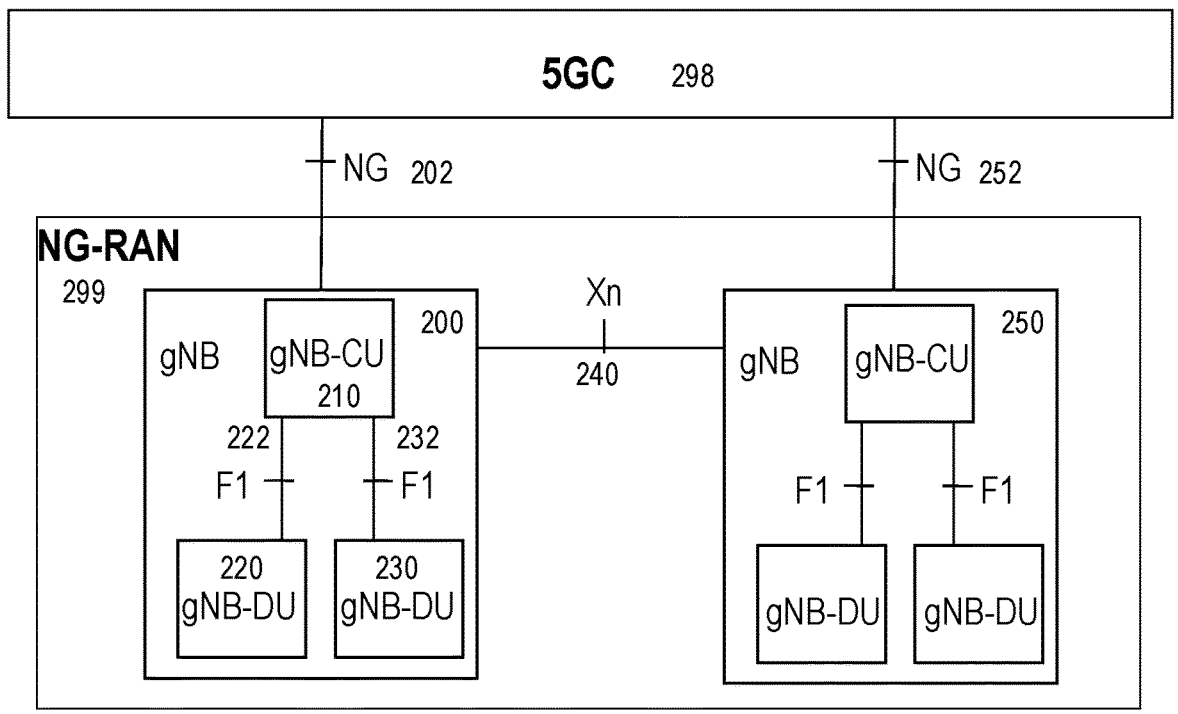
FIGS. 2-3 show two high-level view of an exemplary 5G network architecture, including a Next Generation Radio Access Network (NG-RAN) and a 5G Core (5GC).

FIG. 2 illustrates a high-level view of the 5G network architecture, consisting of a Next Generation RAN (NG-RAN) 299 and a 5G Core (5GC) 298. NG-RAN 299 can include a set of gNodeB's (gNBs) connected to the 5GC via one or more NG interfaces, such as gNBs 200, 250 connected via interfaces 202, 252, respectively. In addition, the gNBs can be connected to each other via one or more Xn interfaces, such as Xn interface 240 between gNBs 200 and 350. With respect to the NR interface to UEs, each of the gNBs can support frequency division duplexing (FDD), time division duplexing (TDD), or a combination thereof.

The NG RAN logical nodes shown in FIG. 2 (and described in 3GPP TS 38.401 and 3GPP TR 38.801) include a central (or centralized) unit (CU or gNB-CU) and one or more distributed (or decentralized) units (DU or gNB-DU). For example, gNB 100 in FIG. 2 includes gNB-CU 210 and gNB-DUs 220 and 330. CUs (e.g., gNB-CU 210) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 222 and 232 shown in FIG. 2. The gNB-CU and connected gNB-DUs are only visible to other gNBs and the 5GC as a gNB, e.g., the F1 interface is not visible beyond gNB-CU. Furthermore, a gNB-CU (or "CU" for short) can host higher-layer protocols such as, e.g., F1 application part protocol (F1-AP), Stream Control Transmission Protocol (SCTP), GPRS Tunnelling Protocol (GTP), Packet Data Convergence Protocol (PDCP), User Datagram Protocol (UDP), Internet Protocol (IP), and Radio Resource Control (RRC) protocol. In contrast, a gNB-DU (or "DU" for short) can host lower-layer protocols such as, e.g., Radio Link Control (RLC), Medium Access Control (MAC), and physical-layer (PHY) protocols.

Other variants of protocol distributions between CU and DU can exist, however, such as hosting the RRC, PDCP and part of the RLC protocol in the CU (e.g., Automatic Retransmission Request (ARQ) function), while hosting the remaining parts of the RLC protocol in the DU, together with MAC and PHY. In some embodiments, the CU can host RRC and PDCP, where PDCP is assumed to handle both UP traffic and CP traffic. Nevertheless, other exemplary embodiments may utilize other protocol splits that by hosting certain protocols in the CU and certain others in the DU. Exemplary embodiments can also locate centralized control plane protocols (e.g., PDCP-C and RRC) in a different CU with respect to the centralized user plane protocols (e.g., PDCP-U).

The NG-RAN is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In NG-Flex configuration, each gNB is connected to all 5GC nodes within a pool area. The pool area is defined in 3GPP TS 23.501. If security protection for control plane and user plane data on TNL of NG-RAN interfaces has to be supported, NDS/IP (3GPP TS 33.401) shall be applied.

Figure 3:
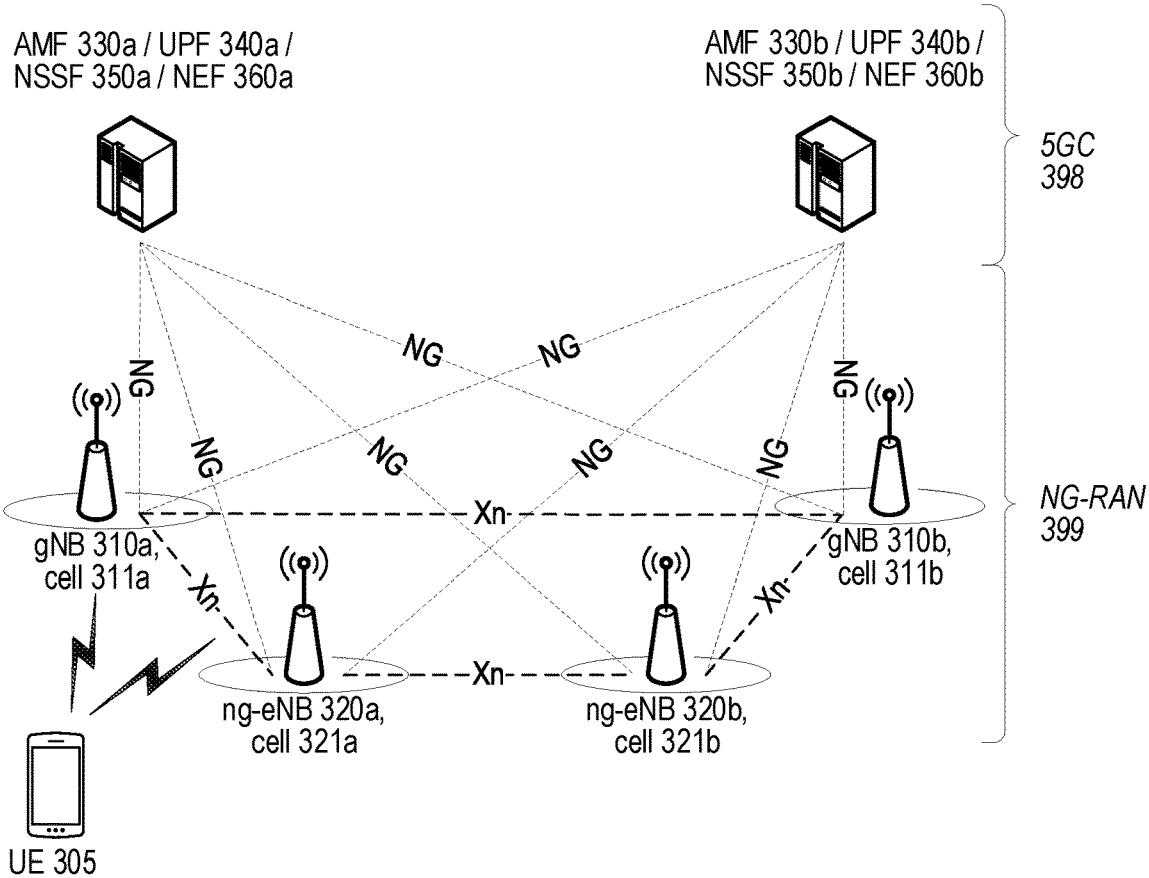

FIG. 3 shows a high-level view of an exemplary 5G network architecture, including a Next Generation Radio Access Network (NG-RAN) 399 and a 5G Core (5GC) 398. As shown in the figure, NG-RAN 399 can include gNBs 310 (e.g., 310a,b) and ng-eNBs 320 (e.g., 320a,b) that are interconnected with each other via respective Xn interfaces. The gNBs and ng-eNBs are also connected via the NG interfaces to 5GC 398, more specifically to the AMF (Access and Mobility Management Function) 330 (e.g., AMFs 330a, b) via respective NG-C interfaces and to the UPF (User Plane Function) 340 (e.g., UPFs 340a,b) via respective NG-U interfaces. Moreover, the AMFs 320a,b can communicate with one or more network slice selection functions (NSSFs, e.g., NSSFs 350a,b) and network exposure functions (NEFs, e.g., NEFs 360a,b). The AMFs, UPFs, NSSFs, and NEFs are described in more detail below.

Each of the gNBs 310 can support the NR radio interface including frequency division duplexing (FDD), time division duplexing (TDD), or a combination thereof. In contrast, each of ng-eNBs 320 can support the LTE radio interface but, unlike conventional LTE eNBs (such as shown in FIG. 1), connect to the 5GC via the NG interface. Each of the gNBs and ng-eNBs can serve a geographic coverage area including one more cells, including cells 311a-b and 321a-b shown as exemplary in FIG. 3. As mentioned above, the gNBs and ng-eNBs can also use various directional beams to provide coverage in the respective cells. Depending on the particular cell in which it is located, a UE 305 can communicate with the gNB or ng-eNB serving that particular cell via the NR or LTE radio interface, respectively.

Each of the gNBs 310 may include and/or be associated with a plurality of Transmission Reception Points (TRPs). Each TRP is typically an antenna array with one or more antenna elements and is located at a specific geographical location. In this manner, a gNB associated with multiple TRPs can transmit the same or different signals from each of the TRPs. For example, a gNB can transmit different version of the same signal on multiple TRPs to a single UE. Each of the TRPs can also employ beams for transmission and reception towards the UEs served by the gNB, as discussed above.

Another change in 5G networks (e.g., in 5GC) is that traditional peer-to-peer interfaces and protocols (e.g., those found in LTE/EPC networks) are modified by a so-called Service Based Architecture (SBA) in which Network Functions (NFs) provide one or more services to one or more service consumers. This can be done, for example, by Hyper Text Transfer Protocol/Representational State Transfer (HTTP/REST) application programming interfaces (APIs). In general, the various services are self-contained functionalities that can be changed and modified in an isolated manner without affecting other services.

Furthermore, the services are composed of various "service operations", which are more granular divisions of the overall service functionality. In order to access a service, both the service name and the targeted service operation must be indicated. The interactions between service consumers and producers can be of the type "request/response" or "subscribe/notify". In the 5G SBA, network repository functions (NRF) allow every network function to discover the services offered by other network functions, and Data Storage Functions (DSF) allow every network function to store its context.

Figure 4:
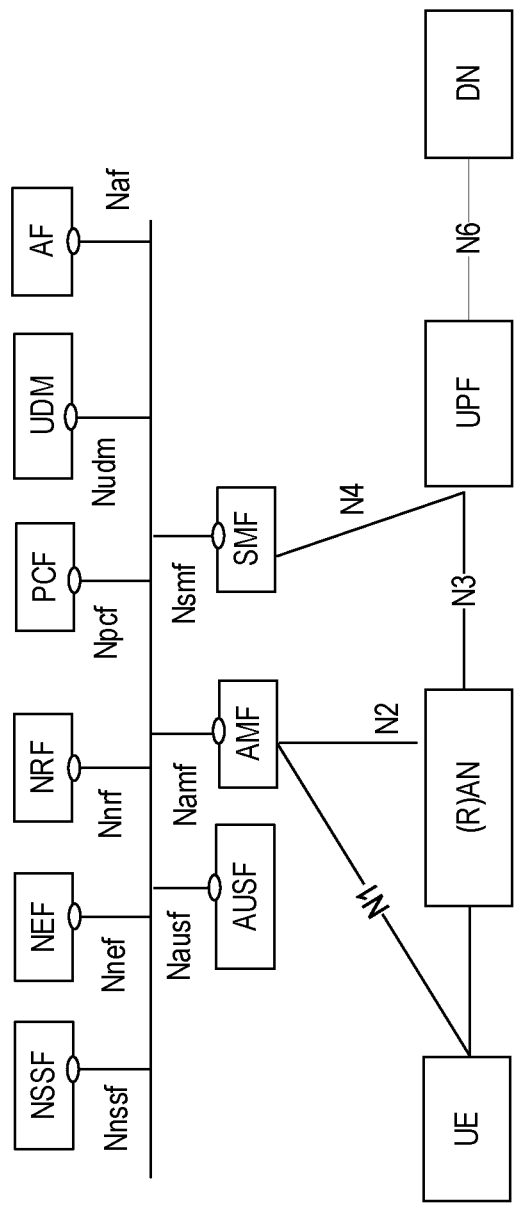
FIG. 4 shows an exemplary non-roaming 5G reference architecture with service-based interfaces and various 3GPP-defined network functions (NFs).

FIG. 4 shows an exemplary non-roaming 5G reference architecture with service-based interfaces and various 3GPP-defined NFs within the Control Plane (CP), including:

- Access and Mobility Management Function (AMF) with Namf interface;
- Session Management Function (SMF) with Nsmf interface;
- User Plane Function (UPF) with Nupf interface;
- Policy Control Function (PCF) with Npcf interface;
- Network Exposure Function (NEF) with Nnef interface;
- Network Repository Function (NRF) with Nnrf interface;
- Network Slice Selection Function (NSSF) with Nnssf interface;
- Authentication Server Function (AUSF) with Nausf interface;
- Application Function (AF) with Naf interface; and
- Unified Data Management (UDM) with Nudm interface.

FIG. 4 further illustrates the 5G network architecture from a reference point perspective. In the architecture shown in FIG. 3, the following reference points are defined:

N1: Reference point between the user equipment (UE) and the AMF.
N2: Reference point between the (R)AN (e.g., NG-RAN) and the AMF.
N3: Reference point between the (R)AN (e.g., NG-RAN) and the UPF.
N4: Reference point between the Session Management Function (SMF) and the UPF.
N6: Reference point between the UPF and a Data Network (DN) (e.g., Internet).

As shown in FIG. 4, UPF(s) handle(s) the user plane path of PDU Sessions between a UE and the DN. 3GPP specifications support deployments with a single UPF or multiple UPFs for a given PDU Session. UPF selection is performed by SMF. The number of UPFs supported for a PDU Session is unrestricted. For IPv4 or IPv6 type PDU Sessions, the PDU Session Anchor may be IP anchor point of the IP address/prefix allocated to the UE. For an IPv4 type PDU Session or an IPv6 type PDU Session without multi-homing, when multiple PDU Session Anchors are used, only one PDU Session Anchor is the IP anchor point for the PDU Session.

Policies for network slicing in LTE (e.g., E-UTRAN and EPC) can be based on one or a combination of the following identifiers related to user, groups, and/or networks:

Public Land Mobile Network ID (PLMN-id) (e.g., "network sharing");
Quality of Service (QoS) Class Identifier (QCI);
Subscribers Profile ID for RAT/Frequency Priority (SPID) (e.g., inbound roamers are assigned a certain SPID);
Dedicated Core Network ID (DCN-id) (e.g., users belonging to the public safety DCN shall be treated according to a certain policy);
MME Group Identity (MMEGI); and/or
Membership of a Closed Subscriber Group (CSG).

Figure 5:
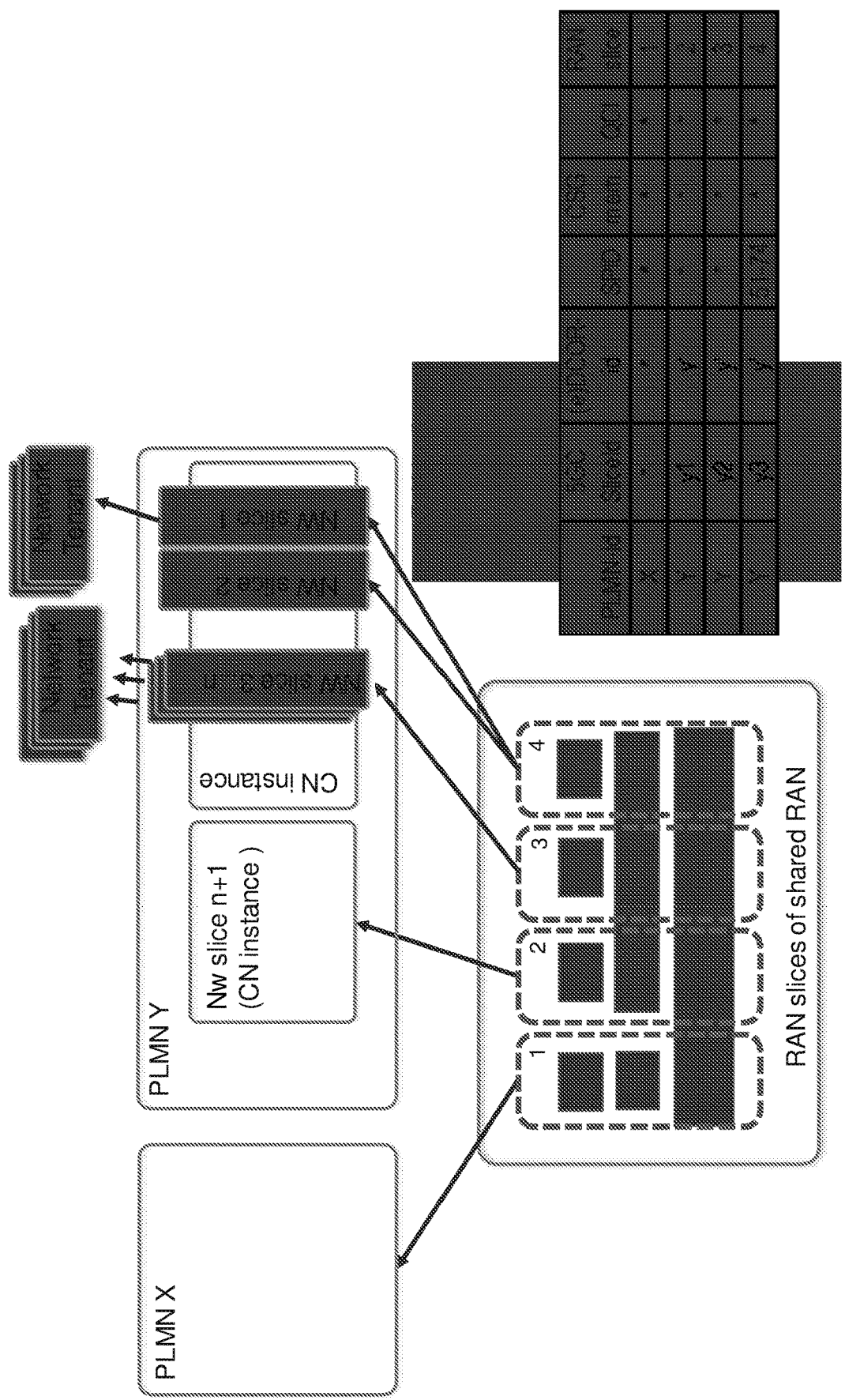
FIG. 5 shows an example of how different "slices" of an LTE RAN (e.g., E-UTRAN) can be associated with various identifiers, which can be applied to RAN resource scheduling according to particular policies.

In LTE, all identifiers and information received from the EPC are available to the eNB, and can be used for network resource management ("slicing") between groups of users. FIG. 5 illustrates examples of how different slices of a RAN (e.g., E-UTRAN) can be identified based on various identifiers, including the ones mentioned above. More specifically, two public land mobile networks (PLMNs) X and Y utilize four different slices of a shared RAN. PLMN X utilizes RAN slice 1, which two core network (CN) instances in PLMN Y utilize RAN slices 2-4. The RAN slice definition/configuration table shows various exemplary identifiers associated with each of these RAN slices. Furthermore, the four RAN slices shown in FIG. 5 can be associated with various scheduling parameters that can be applied to RAN resource scheduling according to particular radio resource policies (RRP) and RAN resource partitioning shares.

The functionality in a 3GPP RAN (e.g., E-UTRAN or NG-RAN) needed to support slicing includes:

An indication from the wireless devices (UE in 3GPP terms) to the RAN that includes information about which slice the UE wants to connect to or select. The enables the RAN to select a CN instance that serves the indicated slice.
Signaling between RAN and CN nodes about which slices are supported.
An indication from CN to RAN that the UE has been admitted to a slice. The information is transferred as part of PDU session resource setup in the RAN, meaning different PDU sessions can be associated with different slices.
Additionally, the CN can provide the RAN with information about which slices the UE is allowed to connect to. With this information, the RAN can apply different resource sharing policies or configuration for different UEs based on slice awareness.

During 3GPP Rel-15 standardization, it was discussed that in some scenarios it might be desirable for an operator to support less than all slices on all frequency layers and/or to have preferred frequency layers for different slices. In order to support such scenarios and to ensure that a UE connected (or allowed to connect) to a particular slice performs access through the preferred frequency layer of that slice, the existing concept of UE RAT/frequency selection priority (RFSP) policy was enhanced to consider connected and/or allowed slices.

In general, UE RAT/frequency selection priority involves the following:

The CN assigns the UE to a RAT/frequency selection priority index (called RFSP). This can be done based on subscription information, information about ongoing services, as well as slice information such as connected or allowed slices.
The CN will send the RFSP value to the RAN to be applied for mobility decisions by UEs in connected state, as well as to be applied when the RAN orders a UE to idle or inactive state. The RFSP value can indicate which pre-configured mobility policy should be applied by the UE in these scenarios.
When the RAN orders the UE to RRC_IDLE or RRC_INACTIVE state in which cell, RAT, and frequency selection is performed autonomously by the UE. The RAN will include some dedicated RAT and frequency priorities which the UE will use for prioritizing different frequency bands. The dedicated priorities are based on the RFSP value provided by the CN, which in turn is based on information about which slices the UE is connected to or is allowed to connect to. Additionally, the RAN is allowed to directly consider its knowledge of the UE's slices when setting RAT and frequency priorities. In the UE, the dedicated RAT/frequency priorities are applied uniformly, regardless of which slices are supported or used.

As an example, using these mechanism, an operator can configure all UEs connected to an Intelligent Transport System (ITS) slice to prioritize an ITS frequency band when available. If the ITS frequency is not available in a certain area, UEs will connect to the second most prioritized frequency.

In case a specific slice is not supported on a specific frequency, this can be handled by assigning a different Tracking Area (TA) to that frequency, and then using existing mechanism to forbid UEs that utilize this specific slice from accessing or camping in that TA. In general, a TA is an area (e.g., of cells) in which a UE can move without updating its location in the CN. The assumption made in Rel-15 was that within a registration area (RA, which can include multiple TAs), there should be consistent slice support in all cells belonging to that RA, meaning all the slices the UE is connected to should either be supported in all cells or not supported in any cell. A consequence of this assumption is the need for consistent slice support for all cells within a TA. Between TAs, however, it is possible to support different slices.

As briefly mentioned above, various enhancements to the handling of slicing in UE RAT/frequency selection priority (RFSP) policy are being considered in ongoing Rel-17 standardization. For example, there is some consideration of the network informing a UE of supported RAN slices in a cell by broadcasting this information. Potential advantages of this approach include:

It would allow more UE control of the frequency the UE should camp on (monitor) or perform access to.

It could allow UEs connected to multiple slices to simultaneously monitor (e.g., camp on) multiple frequencies and perform access on a preferred frequency for a service having data to send. For example, a UE which support both mobile broadband (MBB) and ultra-reliable low latency (URLLC) services could camp on the MBB-preferred frequency but perform access directly on the URLLC-preferred frequency whenever it has URLLC data, thereby avoiding delays due to redirection to the URLLC-preferred frequency.

It would be possible to change the assumption of consistent slice support within a TA, essentially allowing the operator more flexibility to deploy smaller slice areas (e.g., consisting of only one or a few cells, or only one frequency band) without being forced to re-plan the TAs.

However, potential problems, issues, and/or drawbacks of this approach include:

Allowing UE to control frequency selection could lead to inconsistent UE behavior and might make it more difficult to fix problems in the network once the UEs are deployed. For example, it encourages proprietary frequency and/or cell selection algorithms in the UE, such as the following behavior:

A UE could decide by itself to prioritize a certain cell or frequency based on the broadcast information. Thus, UEs from different vendors can behave differently leading to inconsistent end user and network performance.

The UE does also not have the complete network picture and could, in the worst case, degrade system performance by selecting cell that is sub-optimal from a radio or load point of view, thus increasing the system interference or congestion.

It is very difficult to change or correct UE behavior once UEs are out on the market. Not all users upgrade UE software or firmware. UEs also roam in networks where their behavior causes problems due to a different network configuration, even their configuration worked in a home network.

Solutions where the UE needs to camp on multiple frequencies could lead to an increase UE battery consumption so it might not be beneficial in all scenarios.

Such solutions expose slices supported by an operator in a specific area to competitors. This can be important business intelligence that the operator might not want to reveal.

It is less future-proof than the current Rel-15 solution, since if new network slices are introduced in the future (e.g., on the broadcast channel), these slices will not be supported (or understood) by legacy UEs, making new feature only useful for new UEs.

Such solutions do not scale very well. For example, if the operator introduces thousands of network slices in the future, the operator will need to broadcast support for all of these slices. This will consume critical cell broadcast resources.

Changing the assumption of consistent slice support within a TA could lead to other negative consequences with increased signaling and configuration impacts. In other words, since a UE can no longer assume that a cell supports a slice just because it is part of a TA that includes another cell supporting the same slice, additional signaling and/or configuration is needed to make slice support explicit to UEs.

Exemplary embodiments of the present disclosure address these and other problems, issues, and/or drawbacks by a novel mechanism for allowing a UE to consider slice information for selection of a frequency to camp on, monitor, and/or access in a cell, without requiring that the supported slices are broadcast in the cell. This mechanism is based on providing the UE with one or more selection policy parameters (referred to collectively hereinafter as "P") associated with each protocol data unit (PDU) session or network slice (e.g., Slice ID or Network Slice Selection Assistance Information, NSSAI). P can be used together with other information (e.g., dedicated RAT and frequency priorities configured by the RAN) for deciding which frequency to use for any of the following operations:

camping (e.g., monitoring paging channel and/or other common channel(s), obtaining broadcast system information (SI), etc.);

performing access for data or signaling associated with the PDU session or the network slice;

monitoring (e.g. in case the UE has multiple PDU session or slices it could monitor different frequencies for different PDU session or slices so that the UE is ready to perform access on any of the monitored frequency); and cell reselection.

In various embodiments, P can be encoded in different ways. For example, P can consist of detailed frequency information, such as one or more of the following: preferred or allowed camping frequency, preferred or allowed access frequency, preferred or allowed monitoring frequency. As another example, P can consist of one or more index parameter(s) that, together with information broadcast in the cell, gives the UE instructions on one or more of the following: preferred or allowed camping frequency, preferred or allowed access frequency, preferred or allowed monitoring frequency. As a more specific example, if a UE receives P=47 from the network in relation to a particular PDU session, it should preferably perform access for that PDU session on any cells that broadcast the corresponding value 47.

These various embodiments can also be combined, such that P can include both detailed frequency information and one or more index parameters. Using this combination can be beneficial since it gives the UE information about which frequencies to search for, as well as which frequencies the UE should access once the UE has found a cell and acquired the broadcast information.

Even so, it is not necessary to provide P for all PDU sessions or slices. In case P is not provided for a particular PDU session or slice, the UE could perform certain default operations for that session or slice, such as using default value(s) of P, and/or using dedicated RAT and frequency priorities for this PDU session or slice (e.g. provided in the release message to IDLE or INACTIVE).

These embodiments can provide various advantages and/or address various problems, issues, and/or drawbacks. For example, since the actual content of P is not related directly to slices or slice types, broadcasting P does not disclose any information to competitors about which slice(s) the operator supports in an area. As another example, since the number of possible selection policies is likely to be much less than the total number of supported slices (e.g., many slices have the same selection policy), it is more efficient to signal P than to broadcast all supported slices. This advantage holds regardless of whether P is dedicated frequency selection priorities provided in a dedicated message and associated with a PDU session or slice, or P content is broadcasted in the cell (which a UE will associate with P values provided to the UE for each PDU session or slice).

The mechanism provided by various embodiments is also relatively future-proof, since an operator can introduce new slices and/or slice types while still being able to apply selection polices for legacy UEs considering the new slices and slice types. This is possible since the UE should not care which slice it is connected to when applying the selection policies (as determined by P) for the PDU session or slice.

Furthermore, since how the UE should use P in the selection is fully specified, the potential for UE implementation-specific behavior (e.g., as when slice IDs are broadcast) is reduced, resulting in more consistent UE behavior. In addition, since P could contain information about preferred frequency layer for a given PDU session or slice, it is possible for the UE to save battery life if it is already camping on the highest priority frequency layer. In contrast, for the slice broadcast solution, the UE would first need to obtain each frequency before it knows which slices are support on each frequency.

Although the following description of various embodiments is given in terms of network slicing in NR/NG-RAN, embodiments are equally applicable to other RATs/RANs such as LTE/E-UTRAN, WiFi, and possible future RATs (e.g., 6G).

Furthermore, the Rel-15 approach using dedicated RAT/frequency selection priorities considering slice awareness also can be combined with described embodiments to enhance performance. For instance, it is possible to only send P to some UEs and/or for some UE PDU sessions, and rely on the Rel-15 solution for the rest of the UEs and/or UE PDU sessions. In this way, the network can improve performance of UEs accessing specific slices at the cost of some extra singling or configuration, while relying on existing mechanism to handle all other UEs.

In various embodiments, the frequency selection policy parameter, P, can be signalled to UEs in various ways. Moreover, the network can determine the value(s) of P to be signalled based on knowledge about connected slices or allowed slices, subscription information, QoS information, etc. For example, P could be assigned in the HSS or AMF and signalled to the RAN, or derived locally in the RAN (e.g., from the RFSP index).

In one set of embodiments, P can be signalled in a radio resource control (RRC) message from the RAN. Furthermore, the assigned P values can be modified at any time by the RAN, e.g., when the UE performs a handover.

As one example, P can be provided as part of a data radio bearer (DRB) configuration. When a UE receives a DRB configuration including a value of P, the UE can associate this value of P with the PDU session or slice that is also associated with the specific DRB. The UE will then apply the policy indicated by P the next time it is in IDLE or INACTIVE state. In case multiple DRBs are associated with the same slice or PDU session, it should be enough to only signal P for one of the DRBs.

As another example, P can be signalled separately (e.g., from DRB configuration). In this case, the RAN could include information about which PDU session or slice that the provided P value is associated with. This configuration can be sent when the UE is in connected state, or when the UE is released to IDLE or INACTIVE state.

In another set of embodiments, P can be provided in a non-access stratum (NAS) message from the CN to the UE, via the RAN. For example, P can be provided during a PDU session establishment procedure. In this way, the UE can associated the received value of P with the PDU session that is being established. As another example, the UE can be provided with a list of allowed network slices, with each slice being associated with a P value. Furthermore, assigned P values can also be modified when the UE moves to a new area and performs a re-registration procedure towards the CN.

In various embodiments, P can also include various content. In some embodiments, P can contain detailed frequency and/or RAT information. Frequency information could be conveyed as absolute radio-frequency channel number (ARFCN), and can indicate which frequencies should be prioritized for UE camping, which frequencies the UE should be prioritized for UE access, etc.

An advantage of sending detailed frequency information to the UE is that the UE can use this information to determine when to search for additional frequencies and when searching is not required. In contrast, if the slice information is broadcast in the cell, the UE would need to first acquire all or subset of the possible frequencies before it will know which frequencies should be prioritized. Even so, the UE may not need to obtain additional frequencies in some scenarios, e.g., if the UE already camps on the highest-priority frequency.

In other embodiments, P could include one or more index values, which the UE would use to compare with parameters broadcast in different cells. When the UE finds a cell or frequency that broadcasts the same P index value the UE received for a PDU session or slice, the UE will associate that cell or frequency with that PDU session or slice, meaning it can use that frequency or cell for camping, monitoring, and/or access.

An advantage of these embodiments is that information sent in dedicated message to the UE is combined with local information broadcasted in the cell. This makes it possible to set generic frequency/RAT policies applicable in a larger area but also consider local broadcast information, which may be area-specific. For example, an operator can configure frequency 1 to be used for slice 1 in one area, but configured frequency 2 to be used for slice 1 in a different area, without the need to signal new P values to a UE.

Variants of this approach are also possible. For example, if no parameter is broadcasted in a cell, the UE could either consider this cell not applicable for a PDU session or slice for which it received a P index value, or the UE could consider the cell applicable for all PDU session or slices. As another example, if the UE receives matching parameters for multiple frequency layers for a given PDU session or slice, the UE can apply some other prioritization policy (e.g., signalled as part of P or configured via other means) to know which of the frequencies to prioritize.

It is possible to combine the two types of embodiments described above to enhance performance in certain scenarios. For example, the UE can use dedicated frequency information to minimize UE battery consumption when searching for suitable frequencies, and at the same time consider area-specific configurations that are provided by broadcast.

Since legacy Rel-15 UEs would not support and/or recognize P, there should be a mechanism for distinguishing between UEs that do and do not support such features in order to avoid problems in deployment. In some embodiments, a UE can provide an indication in its UE radio access or network capabilities (i.e., sent to the network) that it supports slice or PDU session specific selection policies. In other embodiments, the UE can send a separate indication in an RRC or NAS message. Based on this information, the network will only signal P to UEs that can recognize and utilize the related policies.

In other embodiments, the network can indicate (e.g., in a broadcast message or dedicated message) that it supports these policy mechanisms. This indication would be recognized by UEs supporting the feature (but not legacy UEs), so that they can also indicate support for the feature to the network.

In other embodiments, P values can be appended as non-critical information in messages to the UE. Based on current principles, legacy UEs will ignore non-critical information they do not understand. On the other hand, UEs supporting the feature could recognize and act upon the P values in the message. An advantage of this approach is that it does not required signaling any capability information between the UE and the network.

The following use cases and/or examples are provided for the purpose of illustrating principles of the embodiments discussed above, and should not be considered limiting to functionality and/or scope. A first use case relates to controlling UE camping. In this example, the UE has a single PDU session or slice, and receives a P value associated with this PDU session or slice. For example, P can include a preferred frequency for the UE to camp on. When the UE is in RRC_CONNECTED or a non-connected state (e.g., RRC_IDLE or RRC_INACTIVE), it will prioritize the preferred frequency in the following way:

If the UE is camping on a different frequency, the UE will scan for any cells of the preferred frequency at some interval.

If the UE finds a cell of preferred frequency, it could perform cell reselection to that cell. If the cell belongs to a TA that is not part of the UEs current RA, the UE will perform a UE registration area update procedure.

If the UE is camping on the highest prioritized frequency according to P, and the quality of the pilot signals from a cell on that frequency is above a quality threshold, the UE does not need to search for any other frequency, thus saving battery life.

A second use case relates to determining an optimized and/or enhanced access frequency for UEs connected (or capable of being connected) to multiple network slices. The UE obtains a different P for each slice, indicating the preferred frequency layer to perform access to each slice. P can also include information about which frequency layer the UE should camp on. Assuming that the UE is in RRC_IDLE or RRC_INACTIVE state and data arrives for one of the slices, based on P, the UE will perform access directly on the preferred frequency layer for that slice, even if to this frequency layer is different from the current frequency layer the UE is camping on. Performing access to a frequency layer can include sending a random access message on a random access channel on that frequency layer. In this way, there is no need to re-direct the UE to a different frequency layer which is preferred for the UE slice.

A third use case relates to support for finer slice granularity than TA level, which is the level currently supported in Rel-15. For example, assume that a UE is connected to slice A, and it has received an P value indicating index 47. Assume further that the UE camps on a cell that broadcasts P index value 47. However, due to UE mobility, the signal quality of this cell is degrading such that the UE will need to reselect a different cell. In this reselection process, the UE can prioritize cells that broadcast index value 47. However, if the UE does not find any cell broadcasting index value 47, it could reselect to a cell within the same TA. In this case, the UE might take one or more the following actions:

The UE could perform a re-registration procedure upon entering a cell that does not broadcast index 47. This is different from current UE behaviour, where UE re-registration is only performed when leaving the UE registration area, which is not the case in this example.

The UE can locally deactivate the slice associated with index 47, since that slice is not supported in the new cell. This can include informing the UE operating system (OS) or application layer that the current slice is not available. The UE can also notify the user (e.g., by display, LEDs, vibration, etc.) that the service associated with the deactivated slice is currently unavailable.

These embodiments described above are further illustrated by reference to FIGS. 6-7, which show exemplary methods (e.g., procedures) for a UE and a wireless network, respectively. In other words, various features of the operations described below, with reference to FIGS. 6-7, correspond to various embodiments described above. Furthermore, the exemplary methods shown in FIGS. 6-7 can be used cooperatively to provide various benefits, advantages, and/or solutions to problems described herein. Although the exemplary methods are illustrated in FIGS. 6-7 by specific blocks in particular orders, the operations corresponding to the blocks can be performed in different orders than shown and can be combined and/or divided into blocks having different functionality than shown. Optional blocks or operations are indicated by dashed lines.

Figure 6A:
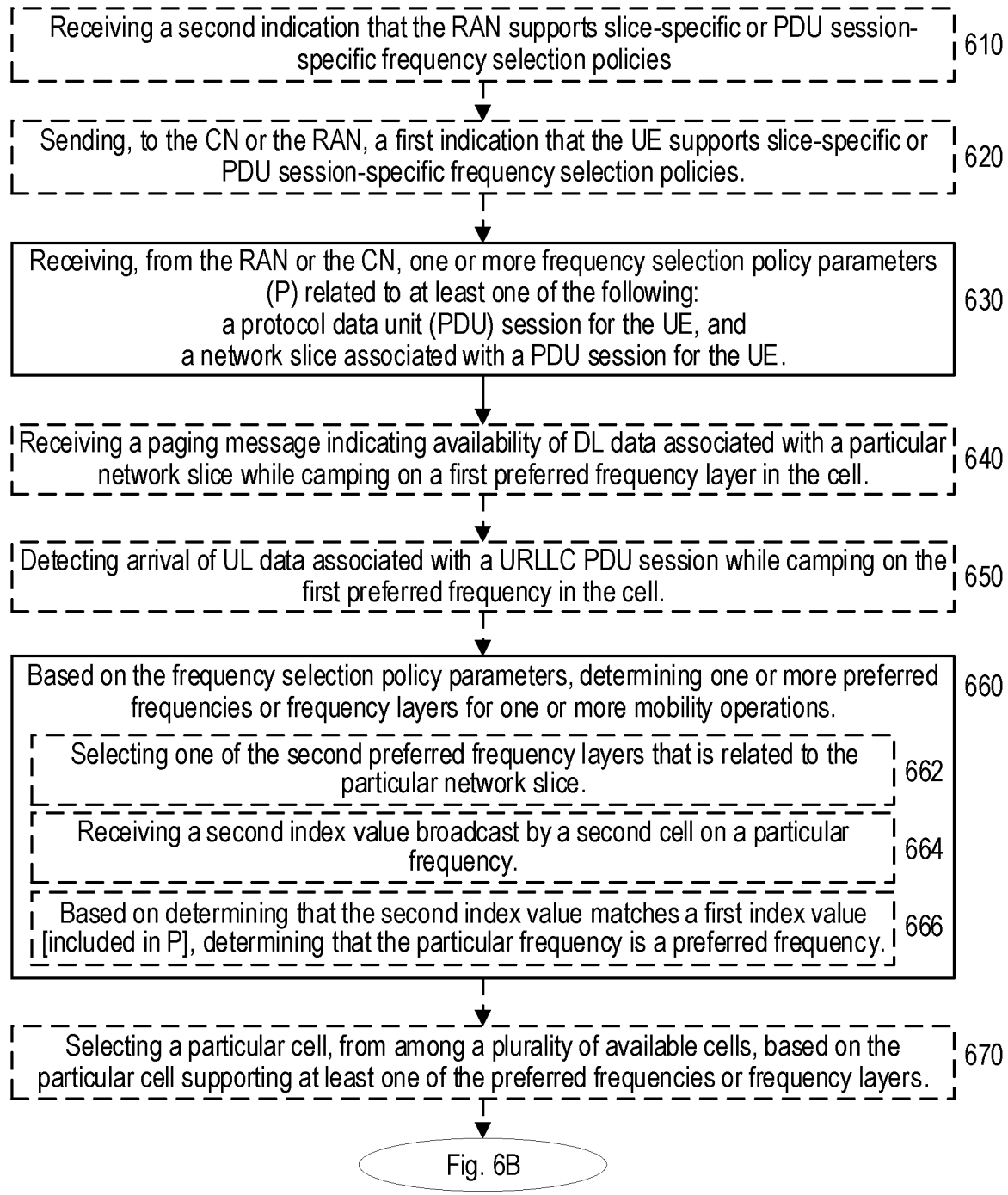
Figure 7:
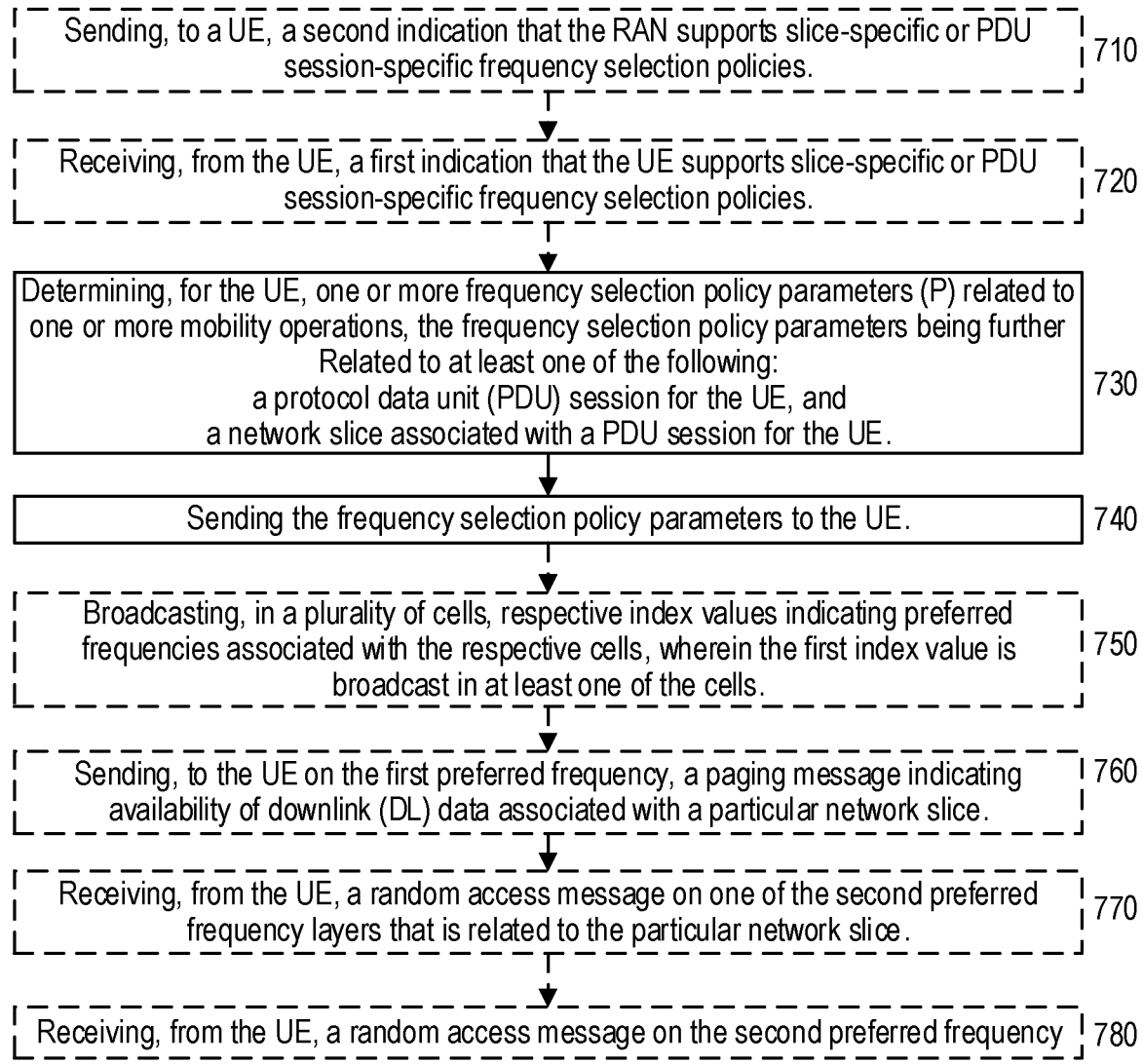
FIG. 7 shows an exemplary method (e.g., procedure) for a wireless network, according to various exemplary embodiments of the present disclosure.

More specifically, FIG. 6 (which includes FIGS. 6A-B) illustrates an exemplary method (e.g., procedure) for a user equipment (UE) operating in a radio access network (RAN) coupled to a core network (CN), in accordance with various exemplary embodiments of the present disclosure. For example, the UE can be arranged and/or configured as described in relation to other figures herein.

The exemplary method can include the operations of block 630, where the UE can receive, from the RAN or the CN, one or more frequency selection policy parameters (e.g., P) related to at least one of the following: a protocol data unit (PDU) session for the UE, and a network slice associated with a PDU session for the UE. The exemplary method can also include the operations of block 660, where the UE can, based on the frequency selection policy parameters, determine one or more preferred frequencies or frequency layers for one or more mobility operations. The exemplary method can also include the operations of block 680, where the UE can perform a first one of the mobility operations on a first one of the determined preferred frequencies or frequency layers.

In various embodiments, the mobility operations can include any of the following:
  camping on at least one of a cell and a frequency layer;
  accessing at least one of a cell and a frequency layer for data or signalling associated with the PDU session or the network slice;
  monitoring a cell; and
  performing a cell reselection.

In some embodiments, the frequency selection policy parameters can include a first plurality of frequencies or frequency layers that are preferred for at least one of the mobility operations and a corresponding first plurality of priorities associated with the respective preferred frequencies or frequency layers. In other embodiments, the frequency selection policy parameters can include an index value associated with a first one of the mobility operations and a preferred frequency or frequency layer associated with a second one of the mobility operations.

In some embodiments, the frequency selection policy parameters include a first preferred frequency for camping on a cell. In some of these embodiments, the operations of block 680 can include the operations of sub-blocks 681-682. In sub-block 681, the UE can scan for any cells at the first preferred frequency while camping on a first cell at a first frequency that is different than the first preferred frequency. In sub-block 682, upon identifying a second cell at the first preferred frequency or frequency layer, the UE can perform a cell reselection to the second cell.

In other of these embodiments, the frequency selection policy parameters also include a plurality of second preferred frequency layers for accessing the cell, with each second preferred frequency layer being related to a different network slice. In such embodiments, the exemplary method can also include the operations of block 630, where the UE can receive a paging message indicating availability of DL data associated with a particular network slice while camping on the first preferred frequency layer in the cell. In such embodiments, the determining operations of block 660 can include the operations of sub-block 662, where the UE can select one of the second preferred frequency layers that is related to the particular network slice. In such embodiments, the performing operations of block 680 can include the operations of sub-block 683, where the UE can access the cell by sending a random access message on the selected second preferred frequency layer.

In some embodiments, the frequency selection policy parameters can include a first index value. In such embodiments, the determining operations of block 660 can include the operations of sub-blocks 664-666. In sub-block 664, the UE can receive a second index value broadcast in a particular cell on a particular frequency. In sub-block 666, the UE can determine that the particular frequency is a preferred frequency based on determining that the second index value matches the first index value.

In some of these embodiments, the performing operations of block 680 can include the operations of sub-blocks 684-685. In sub-block 684, the UE can perform cell reselection to the particular cell when the signal quality of the particular cell is greater than or equal to a threshold. In sub-block 685, the UE can, when the signal quality of the particular cell is less than the threshold, perform cell reselection to a further cell that broadcasts a third index value that does not match the first index value. In some embodiments, the performing operations can also include sub-blocks 686 and/or 687, particularly when the signal quality of the particular cell is less than the threshold. In sub-block 686, the UE can deactivate a network slice associated with the first index value. In sub-block 687, the UE can perform a re-registration procedure with the CN.

In some embodiments, the one or more frequency selection policy parameters can include a first preferred frequency for camping on a cell in relation to an enhanced mobile broadband (eMBB) PDU session, and a second preferred frequency for accessing the cell in relation to an ultra-reliable low-latency communication (URLLC) PDU session. In such embodiments, the exemplary method can also include the operations of block 650, where the UE can, while camping on the first preferred frequency in the cell, detect arrival of UL data associated with the URLLC PDU session. In such embodiments, the performing operations of block 680 can include the operations of sub-block 688, where the UE can access the cell by sending a random access message on the second preferred frequency.

In various embodiments, the frequency selection policy parameters can be received in any of the following ways:
  from the RAN in association with a configuration of a data radio bearer (DRB) related to the PDU session and/or the network slice;
  from the RAN together with an indication of the related PDU session and/or the related network slice;
  from the CN, via the RAN, during establishment of the related PDU session; or
  from the CN, via the RAN, during a re-registration procedure.

In some embodiments, the exemplary method can also include the operations of block 670, where the UE can select a particular cell, from among a plurality of available cells, based on the particular cell supporting at least one of the preferred frequencies or frequency layers. The selected particular cell can then be used for various operations, such as those described above. In some embodiments, the exemplary method can also include the operations of block 620, where the UE can send, to the CN or the RAN, a first indication that the UE supports slice-specific or PDU session-specific frequency selection policies. In some embodiments, the frequency selection policy parameters (P) can be received (e.g., in block 630) in response to the first indication (e.g., sent in block 620).

In some embodiments, the exemplary method can also include the operations of block 610, where the UE can receive (e.g., from the CN or the RAN) a second indication that the RAN supports slice-specific or PDU session-specific frequency selection policies. In some embodiments, the first indication can be sent (e.g., in block 620) in response to the second indication (e.g., received in block 610).

In addition, FIG. 7 illustrates an exemplary method (e.g., procedure) for a wireless network that includes a radio access network (RAN) coupled to a core network (CN), the RAN comprising a plurality of cells, in accordance with various exemplary embodiments of the present disclosure. The exemplary method can be performed by one or more nodes of the network (e.g., CN nodes and/or RAN nodes) that are configured and/or arranged as described herein in relation to other figures.

The exemplary method can include the operations of block 730, where the network can determine, for a user equipment (UE), one or more frequency selection policy parameters (P) related to one or more mobility operations. The frequency selection policy parameters can be further related to a protocol data unit (PDU) session for the UE, and/or a network slice associated with a PDU session for the UE. The exemplary method can include the operations of block 740, where the network can send the frequency selection policy parameters to the UE.

In various embodiments, the mobility operations can include any of the following:
- camping on at least one of a cell and a frequency layer;
- accessing at least one of a cell and a frequency layer for data or signaling associated with the PDU session or the network slice;
- monitoring a cell; and
- performing a cell reselection.

In some embodiments, the frequency selection policy parameters can include a first plurality of frequencies or frequency layers that are preferred for at least one of the mobility operations and a corresponding first plurality of priorities associated with the respective preferred frequencies or frequency layers. In other embodiments, the frequency selection policy parameters can include an index value associated with a first one of the mobility operations and a preferred frequency or frequency layer associated with a second one of the mobility operations.

In some embodiments, the frequency selection policy parameters can include a first preferred frequency for camping on a cell. In some of these embodiments, the frequency selection policy parameters can also include a plurality of second preferred frequency layers for accessing the cell, with each second preferred frequency layer being related to a different network slice. In such embodiments, the exemplary method can also include the operations of blocks 760-770. In block 760, the network can send, to the UE on the first preferred frequency, a paging message indicating availability of downlink (DL) data associated with a particular network slice. In block 770, the network can receive, from the UE, a random access message on one of the second preferred frequency layers that is related to the particular network slice.

In some embodiments, the frequency selection policy parameters can include a first index value. In such embodiments, the exemplary method can also include the operations of block 750, where the network can broadcast, in a plurality of cells, respective index values indicating preferred frequencies associated with the respective cells. The first index value is broadcast in at least one of the cells.

In some embodiments, the one or more frequency selection policy parameters can include a first preferred frequency for camping on a cell in relation to an enhanced mobile broadband (eMBB) PDU session, and a second preferred frequency for accessing the cell in relation to an ultra-reliable low-latency communication (URLLC) PDU session. In such embodiments, the exemplary method can also include the operations of block 780, where the network can receive, from the UE, a random access message on the second preferred frequency.

In various embodiments, the frequency selection policy parameters can be sent to the UE in any of the following ways:
- from the RAN in association with a configuration of a data radio bearer (DRB) related to the PDU session and/or the network slice;
- from the RAN together with an indication of the related PDU session and/or the related network slice;
- from the CN, via the RAN, during establishment of the related PDU session; or
- from the CN, via the RAN, during a re-registration procedure.

In some embodiments, the exemplary method can also include the operations of block 720, where the network can receive, from the UE, a first indication that the UE supports slice-specific or PDU session-specific frequency selection policies. In some embodiments, the frequency selection policy parameters (P) can be sent (e.g., in block 740) in response to the first indication (e.g., received in block 720).

In some embodiments, the exemplary method can also include the operations of block 710, where the network can send, to the UE, a second indication that the RAN supports slice-specific or PDU session-specific frequency selection policies. In some embodiments, the first indication can be received (e.g., in block 720) in response to the second indication (e.g., sent in block 710).

Figure 8:
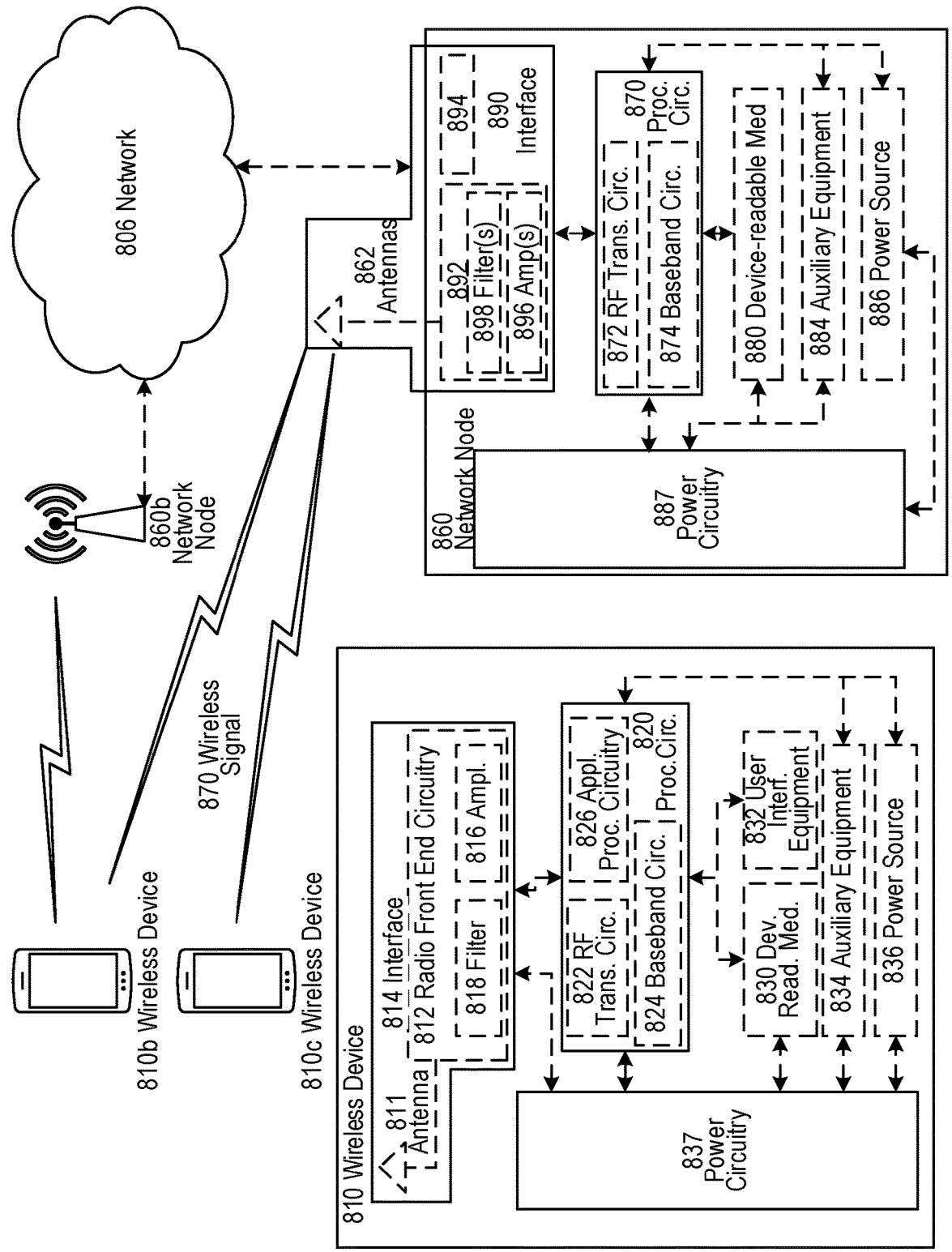
FIG. 8 is a block diagram of an exemplary wireless network configurable according to various exemplary embodiments of the present disclosure.

Although the subject matter described herein can be implemented in any appropriate type of system using any suitable components, the embodiments disclosed herein are described in relation to a wireless network, such as the example wireless network illustrated in FIG. 8. For simplicity, the wireless network of FIG. 8 only depicts network 806, network nodes 860 and 860b, and WDs 810, 810b, and 810c. In practice, a wireless network can further include any additional elements suitable to support communication between wireless devices or between a wireless device and another communication device, such as a landline telephone, a service provider, or any other network node or end device. Of the illustrated components, network node 860 and wireless device (WD) 810 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 806 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 860 and WD 810 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 8, network node 860 includes processing circuitry 870, device readable medium 880, interface 890, auxiliary equipment 884, power source 886, power circuitry 887, and antenna 862. Although network node 860 illustrated in the example wireless network of FIG. 8 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 860 are depicted as single boxes located within a larger box, or nested within multiple boxes, in practice, a network node can comprise multiple different physical components that make up a single illustrated component (e.g., device readable medium 880 can comprise multiple separate hard drives as well as multiple RAM modules).

Similarly, network node 860 can be composed of multiple physically separate components (e.g., a NodeB component and an RNC component, or a BTS component and a BSC component, etc.), which can each have their own respective components. In certain scenarios in which network node 860 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 860 can be configured to support multiple radio access technologies (RATs). In such embodiments, some components can be duplicated (e.g., separate device readable medium 880 for the different RATs) and some components can be reused (e.g., the same antenna 862 can be shared by the RATs). Network node 860 can also include multiple sets of the various illustrated components for different wireless technologies integrated into network node 860, such as, for example, GSM, WCDMA, LTE, NR, WiFi, or Bluetooth wireless technologies. These wireless technologies can be integrated into the same or different chip or set of chips and other components within network node 860.

Processing circuitry 870 can be configured to perform any determining, calculating, or similar operations (e.g., certain obtaining operations) described herein as being provided by a network node. These operations performed by processing circuitry 870 can include processing information obtained by processing circuitry 870 by, for example, converting the obtained information into other information, comparing the obtained information or converted information to information stored in the network node, and/or performing one or more operations based on the obtained information or converted information, and as a result of said processing making a determination.

Processing circuitry 870 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 860, either alone or in conjunction with other network node 860 components (e.g., device readable medium 880). Such functionality can include any of the various wireless features, functions, or benefits discussed herein.

For example, processing circuitry 870 can execute instructions stored in device readable medium 880 or in memory within processing circuitry 870. In some embodiments, processing circuitry 870 can include a system on a chip (SOC). As a more specific example, instructions (also referred to as a computer program product) stored in medium 880 can include instructions that, when executed by processing circuitry 870, can configure network node 860 to perform operations corresponding to various exemplary methods (e.g., procedures) described herein.

In some embodiments, processing circuitry 870 can include one or more of radio frequency (RF) transceiver circuitry 872 and baseband processing circuitry 874. In some embodiments, radio frequency (RF) transceiver circuitry 872 and baseband processing circuitry 874 can be on separate chips (or sets of chips), boards, or units, such as radio units and digital units. In alternative embodiments, part or all of RF transceiver circuitry 872 and baseband processing circuitry 874 can be on the same chip or set of chips, boards, or units In certain embodiments, some or all of the functionality described herein as being provided by a network node, base station, eNB or other such network device can be performed by processing circuitry 870 executing instructions stored on device readable medium 880 or memory within processing circuitry 870. In alternative embodiments, some or all of the functionality can be provided by processing circuitry 870 without executing instructions stored on a separate or discrete device readable medium, such as in a hard-wired manner. In any of those embodiments, whether executing instructions stored on a device readable storage medium or not, processing circuitry 870 can be configured to perform the described functionality. The benefits provided by such functionality are not limited to processing circuitry 870 alone or to other components of network node 860 but are enjoyed by network node 860 as a whole, and/or by end users and the wireless network generally.

Device readable medium 880 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 870. Device readable medium 880 can store any suitable instructions, data or information, including a computer program, software, an application including one or more of logic, rules, code, tables, etc. and/or other instructions capable of being executed by processing circuitry 870 and, utilized by network node 860. Device readable medium 880 can be used to store any calculations made by processing circuitry 870 and/or any data received via interface 890. In some embodiments, processing circuitry 870 and device readable medium 880 can be considered to be integrated.

Interface 890 is used in the wired or wireless communication of signaling and/or data between network node 860, network 806, and/or WDs 810. As illustrated, interface 890 comprises port(s)/terminal(s) 894 to send and receive data, for example to and from network 806 over a wired connection. Interface 890 also includes radio front end circuitry 892 that can be coupled to, or in certain embodiments a part of, antenna 862. Radio front end circuitry 892 comprises filters 898 and amplifiers 896. Radio front end circuitry 892 can be connected to antenna 862 and processing circuitry 870. Radio front end circuitry can be configured to condition signals communicated between antenna 862 and processing circuitry 870. Radio front end circuitry 892 can receive digital data that is to be sent out to other network nodes or WDs via a wireless connection. Radio front end circuitry 892 can convert the digital data into a radio signal having the appropriate channel and bandwidth parameters using a combination of filters 898 and/or amplifiers 896. The radio signal can then be transmitted via antenna 862. Similarly, when receiving data, antenna 862 can collect radio signals which are then converted into digital data by radio front end circuitry 892. The digital data can be passed to processing circuitry 870. In other embodiments, the interface can comprise different components and/or different combinations of components.

In certain alternative embodiments, network node 860 may not include separate radio front end circuitry 892, instead, processing circuitry 870 can comprise radio front end circuitry and can be connected to antenna 862 without separate radio front end circuitry 892. Similarly, in some embodiments, all or some of RF transceiver circuitry 872 can be considered a part of interface 890. In still other embodiments, interface 890 can include one or more ports or terminals 894, radio front end circuitry 892, and RF transceiver circuitry 872, as part of a radio unit (not shown), and interface 890 can communicate with baseband processing circuitry 874, which is part of a digital unit (not shown).

Antenna 862 can include one or more antennas, or antenna arrays, configured to send and/or receive wireless signals. Antenna 862 can be coupled to radio front end circuitry 890 and can be any type of antenna capable of transmitting and receiving data and/or signals wirelessly. In some embodiments, antenna 862 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 862 can be separate from network node 860 and can be connectable to network node 860 through an interface or port.

Antenna 862, interface 890, and/or processing circuitry 870 can be configured to perform any receiving operations and/or certain obtaining operations described herein as being performed by a network node. Any information, data and/or signals can be received from a wireless device, another network node and/or any other network equipment. Similarly, antenna 862, interface 890, and/or processing circuitry 870 can be configured to perform any transmitting operations described herein as being performed by a network node. Any information, data and/or signals can be transmitted to a wireless device, another network node and/or any other network equipment.

Power circuitry 887 can comprise, or be coupled to, power management circuitry and can be configured to supply the components of network node 860 with power for performing the functionality described herein. Power circuitry 887 can receive power from power source 886. Power source 886 and/or power circuitry 887 can be configured to provide power to the various components of network node 860 in a form suitable for the respective components (e.g., at a voltage and current level needed for each respective component). Power source 886 can either be included in, or external to, power circuitry 887 and/or network node 860. For example, network node 860 can be connectable to an external power source (e.g., an electricity outlet) via an input circuitry or interface such as an electrical cable, whereby the external power source supplies power to power circuitry 887. As a further example, power source 886 can comprise a source of power in the form of a battery or battery pack which is connected to, or integrated in, power circuitry 887. The battery can provide backup power should the external power source fail. Other types of power sources, such as photovoltaic devices, can also be used.

Alternative embodiments of network node 860 can include additional components beyond those shown in FIG. 8 that can be responsible for providing certain aspects of the network node's functionality, including any of the functionality described herein and/or any functionality necessary to support the subject matter described herein. For example, network node 860 can include user interface equipment to allow and/or facilitate input of information into network node 860 and to allow and/or facilitate output of information from network node 860. This can allow and/or facilitate a user to perform diagnostic, maintenance, repair, and other administrative functions for network node 860.

In some embodiments, a wireless device (WD, e.g., WD 810) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 810 includes antenna 811, interface 814, processing circuitry 820, device readable medium 830, user interface equipment 832, auxiliary equipment 834, power source 836 and power circuitry 837. WD 810 can include multiple sets of one or more of the illustrated components for different wireless technologies supported by WD 810, such as, for example, GSM, WCDMA, LTE, NR, WiFi, WiMAX, or Bluetooth wireless technologies, just to mention a few. These wireless technologies can be integrated into the same or different chips or set of chips as other components within WD 810.

Antenna 811 can include one or more antennas or antenna arrays, configured to send and/or receive wireless signals, and is connected to interface 814. In certain alternative embodiments, antenna 811 can be separate from WD 810 and be connectable to WD 810 through an interface or port. Antenna 811, interface 814, and/or processing circuitry 820 can be configured to perform any receiving or transmitting operations described herein as being performed by a WD. Any information, data and/or signals can be received from a network node and/or another WD. In some embodiments, radio front end circuitry and/or antenna 811 can be considered an interface.

As illustrated, interface 814 comprises radio front end circuitry 812 and antenna 811. Radio front end circuitry 812 comprise one or more filters 818 and amplifiers 816. Radio front end circuitry 814 is connected to antenna 811 and processing circuitry 820 and can be configured to condition signals communicated between antenna 811 and processing circuitry 820. Radio front end circuitry 812 can be coupled to or a part of antenna 811. In some embodiments, WD 810 may not include separate radio front end circuitry 812; rather, processing circuitry 820 can comprise radio front end circuitry and can be connected to antenna 811. Similarly, in some embodiments, some or all of RF transceiver circuitry 822 can be considered a part of interface 814. Radio front end circuitry 812 can receive digital data that is to be sent out to other network nodes or WDs via a wireless connection. Radio front end circuitry 812 can convert the digital data into a radio signal having the appropriate channel and bandwidth parameters using a combination of filters 818 and/or amplifiers 816. The radio signal can then be transmitted via antenna 811. Similarly, when receiving data, antenna 811 can collect radio signals which are then converted into digital data by radio front end circuitry 812. The digital data can be passed to processing circuitry 820. In other embodiments, the interface can comprise different components and/or different combinations of components.

Processing circuitry 820 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 810 functionality either alone or in combination with other WD 810 components, such as device readable medium 830. Such functionality can include any of the various wireless features or benefits discussed herein.

For example, processing circuitry 820 can execute instructions stored in device readable medium 830 or in memory within processing circuitry 820 to provide the functionality disclosed herein. More specifically, instructions (also referred to as a computer program product) stored in medium 830 can include instructions that, when executed by processor 820, can configure wireless device 810 to perform operations corresponding to various exemplary methods (e.g., procedures) described herein.

As illustrated, processing circuitry 820 includes one or more of RF transceiver circuitry 822, baseband processing circuitry 824, and application processing circuitry 826. In other embodiments, the processing circuitry can comprise different components and/or different combinations of components. In certain embodiments processing circuitry 820 of WD 810 can comprise a SOC. In some embodiments, RF transceiver circuitry 822, baseband processing circuitry 824, and application processing circuitry 826 can be on separate chips or sets of chips. In alternative embodiments, part or all of baseband processing circuitry 824 and application processing circuitry 826 can be combined into one chip or set of chips, and RF transceiver circuitry 822 can be on a separate chip or set of chips. In still alternative embodiments, part or all of RF transceiver circuitry 822 and baseband processing circuitry 824 can be on the same chip or set of chips, and application processing circuitry 826 can be on a separate chip or set of chips. In yet other alternative embodiments, part or all of RF transceiver circuitry 822, baseband processing circuitry 824, and application processing circuitry 826 can be combined in the same chip or set of chips. In some embodiments, RF transceiver circuitry 822 can be a part of interface 814. RF transceiver circuitry 822 can condition RF signals for processing circuitry 820.

In certain embodiments, some or all of the functionality described herein as being performed by a WD can be provided by processing circuitry 820 executing instructions stored on device readable medium 830, which in certain embodiments can be a computer-readable storage medium. In alternative embodiments, some or all of the functionality can be provided by processing circuitry 820 without executing instructions stored on a separate or discrete device readable storage medium, such as in a hard-wired manner. In any of those particular embodiments, whether executing instructions stored on a device readable storage medium or not, processing circuitry 820 can be configured to perform the described functionality. The benefits provided by such functionality are not limited to processing circuitry 820 alone or to other components of WD 810, but are enjoyed by WD 810 as a whole, and/or by end users and the wireless network generally.

Processing circuitry 820 can be configured to perform any determining, calculating, or similar operations (e.g., certain obtaining operations) described herein as being performed by a WD. These operations, as performed by processing circuitry 820, can include processing information obtained by processing circuitry 820 by, for example, converting the obtained information into other information, comparing the obtained information or converted information to information stored by WD 810, and/or performing one or more operations based on the obtained information or converted information, and as a result of said processing making a determination.

Device readable medium 830 can be operable to store a computer program, software, an application including one or more of logic, rules, code, tables, etc. and/or other instructions capable of being executed by processing circuitry 820. Device readable medium 830 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that to can be used by processing circuitry 820. In some embodiments, processing circuitry 820 and device readable medium 830 can be considered to be integrated.

User interface equipment 832 can include components that allow and/or facilitate a human user to interact with WD 810. Such interaction can be of many forms, such as visual, audial, tactile, etc. User interface equipment 832 can be operable to produce output to the user and to allow and/or facilitate the user to provide input to WD 810. The type of interaction can vary depending on the type of user interface equipment 832 installed in WD 810. For example, if WD 810 is a smart phone, the interaction can be via a touch screen; if WD 810 is a smart meter, the interaction can be through a screen that provides usage (e.g., the number of gallons used) or a speaker that provides an audible alert (e.g., if smoke is detected). User interface equipment 832 can include input interfaces, devices and circuits, and output interfaces, devices and circuits. User interface equipment 832 can be configured to allow and/or facilitate input of information into WD 810 and is connected to processing circuitry 820 to allow and/or facilitate processing circuitry 820 to process the input information. User interface equipment 832 can include, for example, a microphone, a proximity or other sensor, keys/buttons, a touch display, one or more cameras, a USB port, or other input circuitry. User interface equipment 832 is also configured to allow and/or facilitate output of information from WD 810, and to allow and/or facilitate processing circuitry 820 to output information from WD 810. User interface equipment 832 can include, for example, a speaker, a display, vibrating circuitry, a USB port, a headphone interface, or other output circuitry. Using one or more input and output interfaces, devices, and circuits, of user interface equipment 832, WD 810 can communicate with end users and/or the wireless network and allow and/or facilitate them to benefit from the functionality described herein.

Auxiliary equipment 834 is operable to provide more specific functionality which may not be generally performed by WDs. This can comprise specialized sensors for doing measurements for various purposes, interfaces for additional types of communication such as wired communications etc. The inclusion and type of components of auxiliary equipment 834 can vary depending on the embodiment and/or scenario.

Power source 836 can, in some embodiments, be in the form of a battery or battery pack. Other types of power sources, such as an external power source (e.g., an electricity outlet), photovoltaic devices or power cells, can also be used. WD 810 can further comprise power circuitry 837 for delivering power from power source 836 to the various parts of WD 810 which need power from power source 836 to carry out any functionality described or indicated herein. Power circuitry 837 can in certain embodiments comprise power management circuitry. Power circuitry 837 can additionally or alternatively be operable to receive power from an external power source; in which case WD 810 can be connectable to the external power source (such as an electricity outlet) via input circuitry or an interface such as an electrical power cable. Power circuitry 837 can also in certain embodiments be operable to deliver power from an external power source to power source 836. This can be, for example, for the charging of power source 836. Power circuitry 837 can perform any converting or other modification to the power from power source 836 to make it suitable for supply to the respective components of WD 810.

Figure 9:
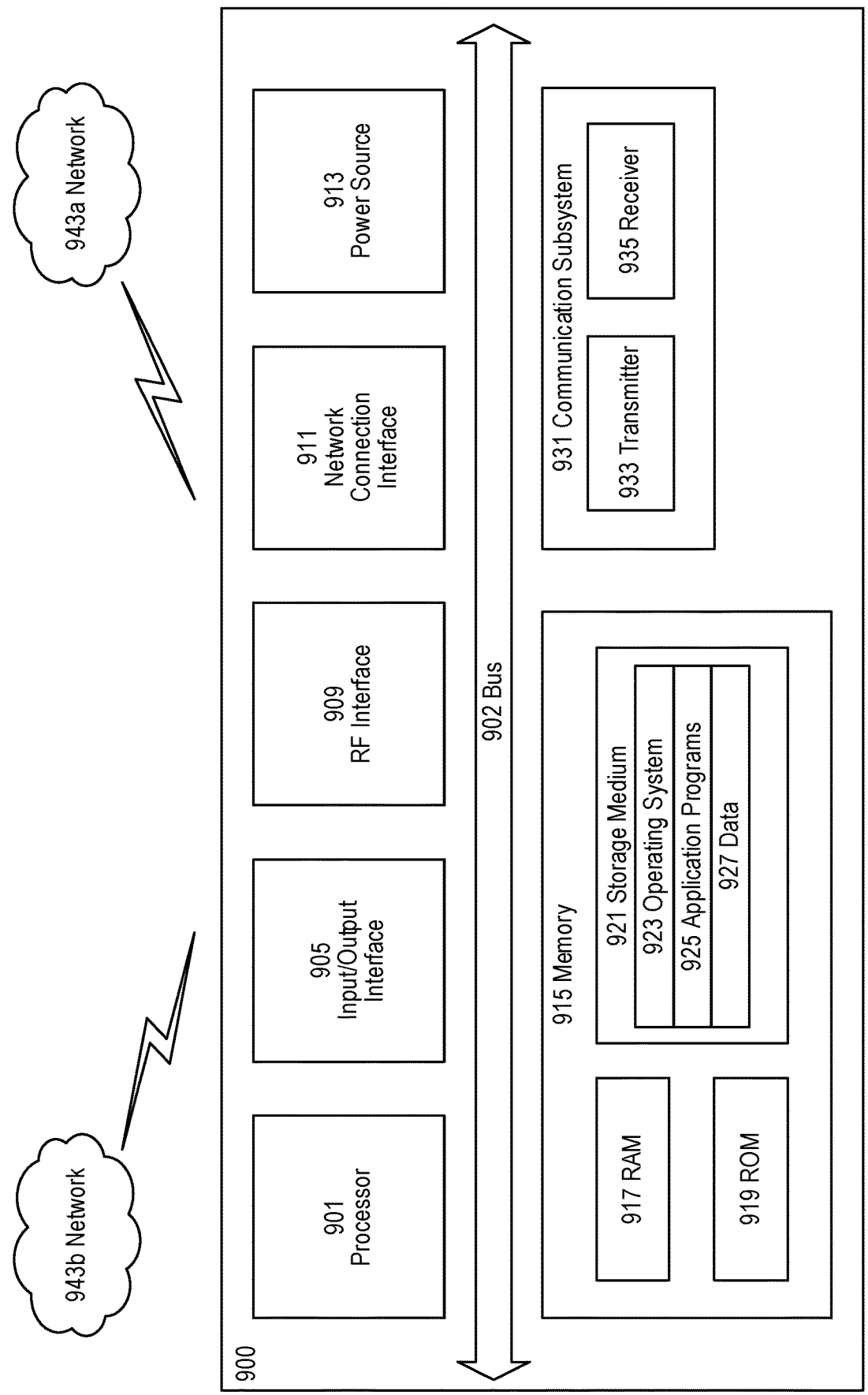
FIG. 9 is a block diagram of an exemplary user equipment (UE) configurable according to various exemplary embodiments of the present disclosure.

FIG. 9 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 9200 can be any UE identified by the $3^{rd}$ Generation Partnership Project (3GPP), including a NB-IoT UE, a machine type communication (MTC) UE, and/or an enhanced MTC (eMTC) UE. UE 900, as illustrated in FIG. 9, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 9 is a UE, the components discussed herein are equally applicable to a WD, and vice-versa.

In FIG. 9, UE 900 includes processing circuitry 901 that is operatively coupled to input/output interface 905, radio frequency (RF) interface 909, network connection interface 911, memory 915 including random access memory (RAM) 917, read-only memory (ROM) 919, and storage medium 921 or the like, communication subsystem 931, power source 933, and/or any other component, or any combination thereof. Storage medium 921 includes operating system 923, application program 925, and data 927. In other embodiments, storage medium 921 can include other similar types of information. Certain UEs can utilize all of the components shown in FIG. 9, or only a subset of the components. The level of integration between the components can vary from one UE to another UE. Further, certain UEs can contain multiple instances of a component, such as multiple processors, memories, transceivers, transmitters, receivers, etc.

In FIG. 9, processing circuitry 901 can be configured to process computer instructions and data. Processing circuitry 901 can be configured to implement any sequential state machine operative to execute machine instructions stored as machine-readable computer programs in the memory, such as one or more hardware-implemented state machines (e.g., in discrete logic, to FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 901 can include two central processing units (CPUs). Data can be information in a form suitable for use by a computer.

In the depicted embodiment, input/output interface 905 can be configured to provide a communication interface to an input device, output device, or input and output device. UE 900 can be configured to use an output device via input/output interface 905. An output device can use the same type of interface port as an input device. For example, a USB port can be used to provide input to and output from UE 900. The output device can be a speaker, a sound card, a video card, a display, a monitor, a printer, an actuator, an emitter, a smartcard, another output device, or any combination thereof. UE 900 can be configured to use an input device via input/output interface 905 to allow and/or facilitate a user to capture information into UE 900. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 9, RF interface 909 can be configured to provide a communication interface to RF components such as a transmitter, a receiver, and an antenna. Network connection interface 911 can be configured to provide a communication interface to network 943a. Network 943a can encompass wired and/or wireless networks such as a local-area network (LAN), a wide-area network (WAN), a computer network, a wireless network, a telecommunications network, another like network or any combination thereof. For example, network 943a can comprise a Wi-Fi network. Network connection interface 911 can be configured to include a receiver and a transmitter interface used to communicate with one or more other devices over a communication network according to one or more communication protocols, such as Ethernet, TCP/IP, SONET, ATM, or the like. Network connection interface 911 can implement receiver and transmitter functionality appropriate to the communication network links (e.g., optical, electrical, and the like). The transmitter and receiver functions can share circuit components, software or firmware, or alternatively can be implemented separately.

RAM 917 can be configured to interface via bus 902 to processing circuitry 901 to provide to storage or caching of data or computer instructions during the execution of software programs such as the operating system, application programs, and device drivers. ROM 919 can be configured to provide computer instructions or data to processing circuitry 901. For example, ROM 919 can be configured to store invariant low-level system code or data for basic system functions such as basic input and output (I/O), startup, or reception of keystrokes from a keyboard that are stored in a non-volatile memory. Storage medium 921 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 921 can be configured to include operating system 923; application program 925 such as a web browser application, a widget or gadget engine or another application; and data file 927. Storage medium 921 can store, for use by UE 900, any of a variety of various operating systems or combinations of operating systems. For example, application program 925 can include executable program instructions (also referred to as a computer program product) that, when executed by processor 901, can configure UE 900 to perform operations corresponding to various exemplary methods (e.g., procedures) described herein.

Storage medium 921 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 921 can allow and/or facilitate UE 900 to access computer-executable instructions, application programs or the like, stored on transitory or non-transitory memory media, to off-load data, or to upload data. An article of manufacture, such as one utilizing a communication system can be tangibly embodied in storage medium 921, which can comprise a device readable medium.

In FIG. 9, processing circuitry 901 can be configured to communicate with network 943b using communication subsystem 931. Network 943a and network 943b can be the same network or networks or different network or networks. Communication subsystem 931 can be configured to include one or more transceivers used to communicate with network 943b. For example, communication subsystem 931 can be configured to include one or more transceivers used to communicate with one or more remote transceivers of another device capable of wireless communication such as another WD, UE, or base station of a radio access network (RAN) according to one or more communication protocols, such as IEEE 802.9, CDMA, WCDMA, GSM, LTE, UTRAN, WiMax, or the like. Each transceiver can include transmitter 933 and/or receiver 935 to implement transmitter or receiver functionality, respectively, appropriate to the RAN links (e.g., frequency allocations and the like). Further, transmitter 933 and receiver 935 of each transceiver can share circuit components, software or firmware, or alternatively can be implemented separately.

In the illustrated embodiment, the communication functions of communication subsystem 931 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 931 can include cellular communication, Wi-Fi communication, Bluetooth communication, and GPS communication. Network 943b can encompass wired and/or wireless networks such as a local-area network (LAN), a wide-area network (WAN), a computer network, a wireless network, a telecommunications network, another like network or any combination thereof. For example, network 943b can be a cellular network, a Wi-Fi network, and/or a near-field network. Power source 913 can be configured to provide alternating current (AC) or direct current (DC) power to components of UE 900.

The features, benefits and/or functions described herein can be implemented in one of the components of UE 900 or partitioned across multiple components of UE 900. Further, the features, benefits, and/or functions described herein can be implemented in any combination of hardware, software or firmware. In one example, communication subsystem 931 can be configured to include any of the components described herein. Further, processing circuitry 901 can be configured to communicate with any of such components over bus 902. In another example, any of such components can be represented by program instructions stored in memory that when executed by processing circuitry 901 perform the corresponding functions described herein. In another example, the functionality of any of such components can be partitioned between processing circuitry 901 and communication subsystem 931. In another example, the non-computationally intensive functions of any of such components can be implemented in software or firmware and the computationally intensive functions can be implemented in hardware.

Figure 10:
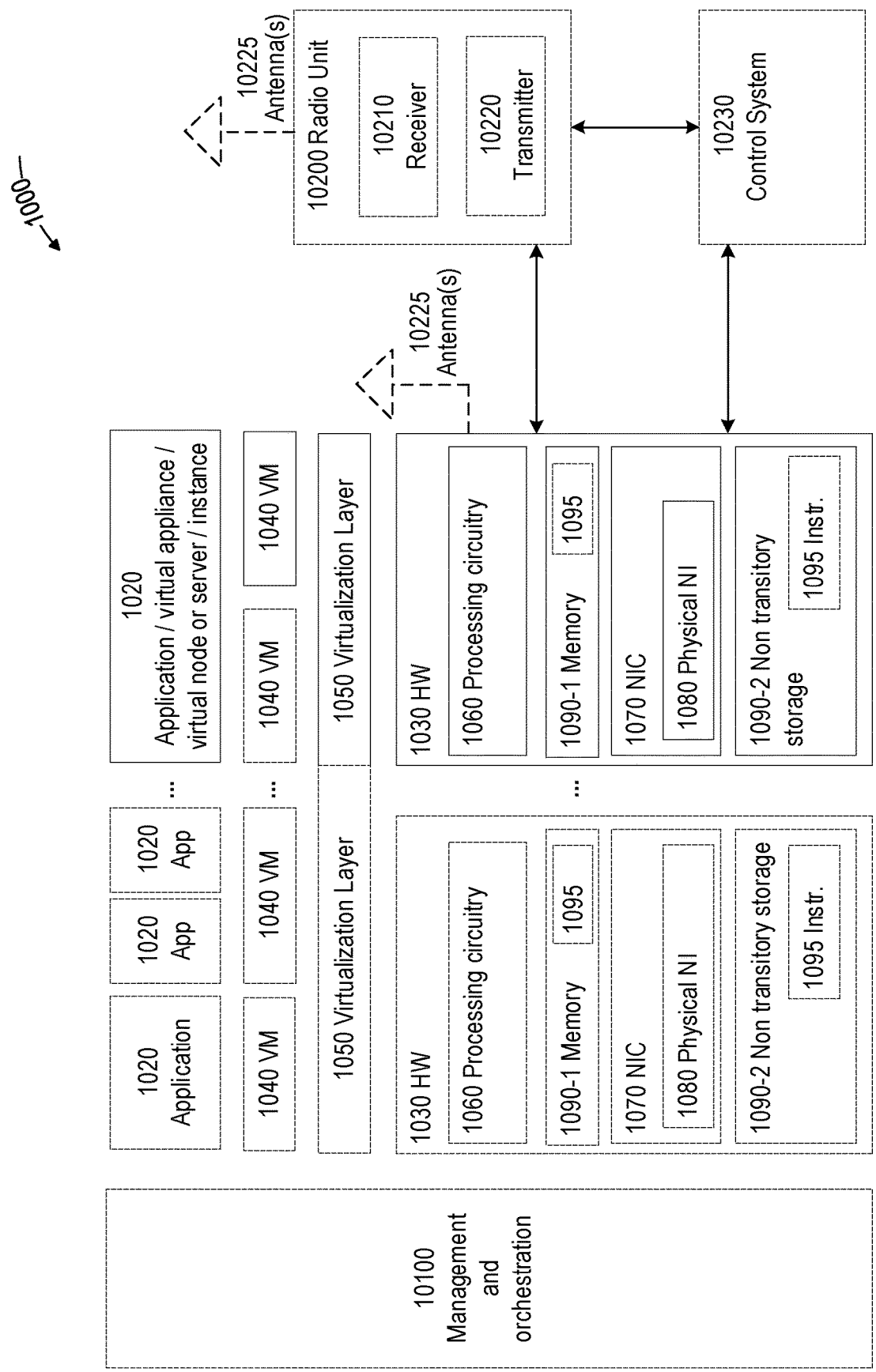
FIG. 10 is a block diagram of illustrating a virtualization environment that can facilitate virtualization of various functions implemented according to various exemplary embodiments of the present disclosure.

FIG. 10 is a schematic block diagram illustrating a virtualization environment 1000 in which functions implemented by some embodiments can be virtualized. In the present context, virtualizing means creating virtual versions of apparatuses or devices which can include virtualizing hardware platforms, storage devices and networking resources. As used herein, to virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 1000 hosted by one or more of hardware nodes 1030. Further, in embodiments in which the virtual node is not a radio access node or does not require radio connectivity (e.g., a core network node), then the network node can be entirely virtualized.

The functions can be implemented by one or more applications 1020 (which can alternatively be called software instances, virtual appliances, network functions, virtual nodes, virtual network functions, etc.) operative to implement some of the features, functions, and/or benefits of some of the embodiments disclosed herein. Applications 1020 are run in virtualization environment 1000 which provides hardware 1030 comprising processing circuitry 1060 and memory 1090. Memory 1090 contains instructions 1095 executable by processing circuitry 1060 whereby application 1020 is operative to provide one or more of the features, benefits, and/or functions disclosed herein.

Virtualization environment 1000 can include general-purpose or special-purpose network hardware devices (or nodes) 1030 comprising a set of one or more processors or processing circuitry 1060, which can be commercial off-the-shelf (COTS) processors, dedicated Application Specific Integrated Circuits (ASICs), or any other type of processing circuitry including digital or analog hardware components or special purpose processors. Each hardware device can comprise memory 1090-1 which can be non-persistent memory for temporarily storing instructions 1095 or software executed by processing circuitry 1060. For example, instructions 1095 can include program instructions (also referred to as a computer program product) that, when executed by processing circuitry 1060, can configure hardware node 1020 to perform operations corresponding to various exemplary methods (e.g., procedures) described herein. Such operations can also be attributed to virtual node(s) 1020 that is/are hosted by hardware node 1030.

Each hardware device can comprise one or more network interface controllers (NICs) 1070, also known as network interface cards, which include physical network interface 1080. Each hardware device can also include non-transitory, persistent, machine-readable storage media 1090-2 having stored therein software 1095 and/or instructions executable by processing circuitry 1060. Software 1095 can include any type of software including software for instantiating one or more virtualization layers 1050 (also referred to as hypervisors), software to execute virtual machines 1040 as well as software allowing it to execute functions, features and/or benefits described in relation with some embodiments described herein.

Virtual machines 1040, comprise virtual processing, virtual memory, virtual networking or interface and virtual storage, and can be run by a corresponding virtualization layer 1050 or hypervisor. Different embodiments of the instance of virtual appliance 1020 can be implemented on one or more of virtual machines 1040, and the implementations can be made in different ways.

During operation, processing circuitry 1060 executes software 1095 to instantiate the hypervisor or virtualization layer 1050, which can sometimes be referred to as a virtual machine monitor (VMM). Virtualization layer 1050 can present a virtual operating platform that appears like networking hardware to virtual machine 1040.

As shown in FIG. 10, hardware 1030 can be a standalone network node with generic or specific components. Hardware 1030 can comprise antenna 10225 and can implement some functions via virtualization. Alternatively, hardware 1030 can be part of a larger cluster of hardware (e.g., such as in a data center or customer premise equipment (CPE)) where many hardware nodes work together and are managed via management and orchestration (MANO) 10100, which, among others, oversees lifecycle management of applications 1020.

Virtualization of the hardware is in some contexts referred to as network function virtualization (NFV). NFV can be used to consolidate many network equipment types onto industry standard high-volume server hardware, physical switches, and physical storage, which can be located in data centers, and customer premise equipment.

In the context of NFV, virtual machine 1040 can be a software implementation of a physical machine that runs programs as if they were executing on a physical, non-virtualized machine. Each of virtual machines 1040, and that part of hardware 1030 that executes that virtual machine, be it hardware dedicated to that virtual machine and/or hardware shared by that virtual machine with others of the virtual machines 1040, forms a separate virtual network elements (VNE).

Still in the context of NFV, Virtual Network Function (VNF) is responsible for handling specific network functions that run in one or more virtual machines 1040 on top of hardware networking infrastructure 1030 and corresponds to application 1020 in FIG. 10.

In some embodiments, one or more radio units 10200 that each include one or more transmitters 10220 and one or more receivers 10210 can be coupled to one or more antennas 10225. Radio units 10200 can communicate directly with hardware nodes 1030 via one or more appropriate network interfaces and can be used in combination with the virtual components to to provide a virtual node with radio capabilities, such as a radio access node or a base station. Nodes arranged in this manner can also communicate with one or more UEs, such as described elsewhere herein.

In some embodiments, some signaling can be performed via control system 10230, which can alternatively be used for communication between the hardware nodes 1030 and radio units 10200.

Figure 11:
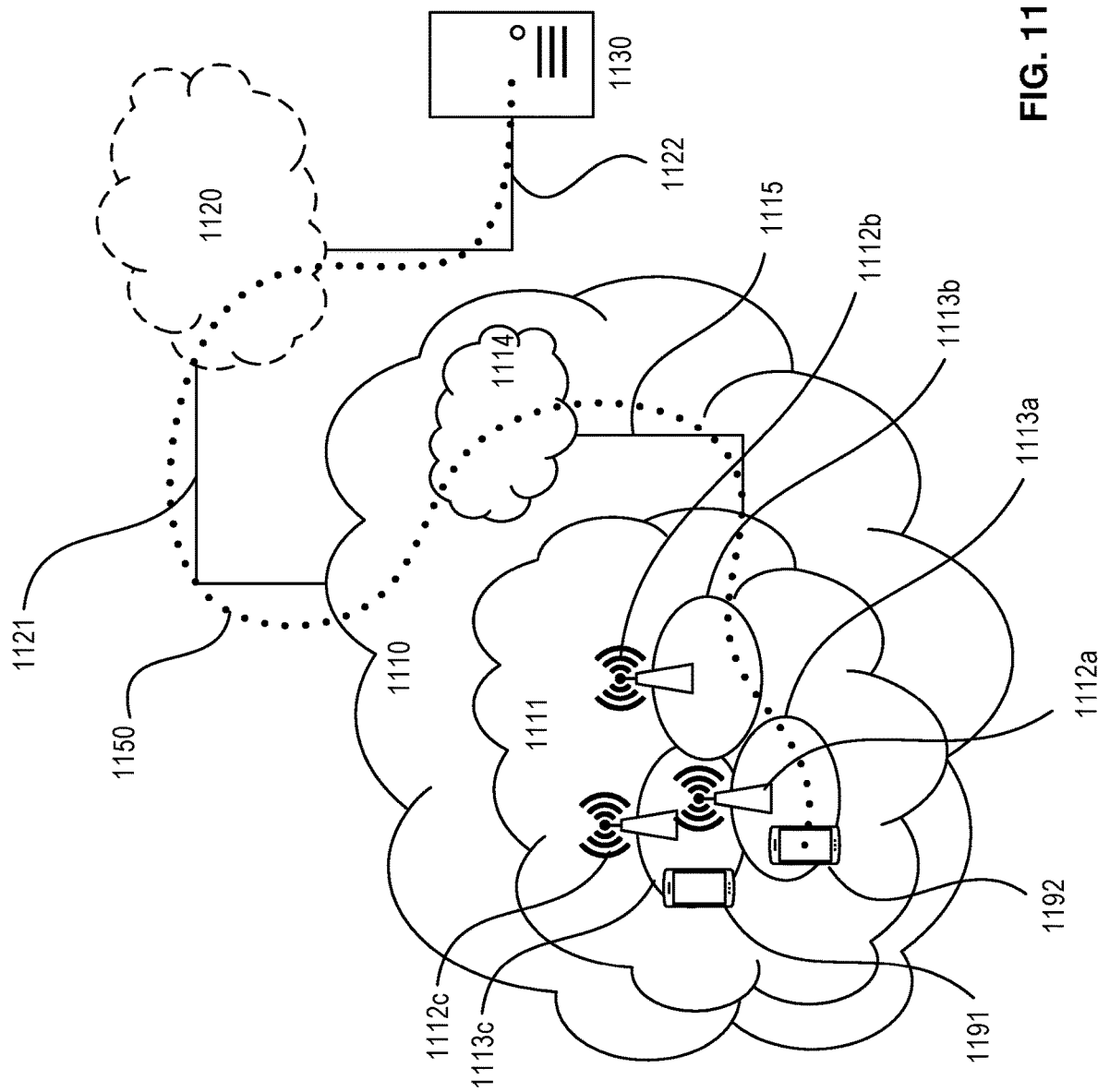
FIGS. 11-12 are block diagrams of exemplary communication systems configurable according to various exemplary embodiments of the present disclosure.

With reference to FIG. 11, in accordance with an embodiment, a communication system includes telecommunication network 1110, such as a 3GPP-type cellular network, which comprises access network 1111, such as a radio access network, and core network 1114. Access network 1111 comprises a plurality of base stations 1112a, 1112b, 1112c, such as NBs, eNBs, gNBs or other types of wireless access points, each defining a corresponding coverage area 1113a, 1113b, 1113c. Each base station 1112a, 1112b, 1112c is connectable to core network 1114 over a wired or wireless connection 1115. A first UE 1191 located in coverage area 1113c can be configured to wirelessly connect to, or be paged by, the corresponding base station 1112c. A second UE 1192 in coverage area 1113a is wirelessly connectable to the corresponding base station 1112a. While a plurality of UEs 1191, 1192 are illustrated in this example, the disclosed embodiments are equally applicable to a situation where a sole UE is in the coverage area or where a sole UE is connecting to the Telecommunication network 1110 is itself connected to host computer 1130, which can be embodied in the hardware and/or software of a standalone server, a cloud-implemented server, a distributed server or as processing resources in a server farm. Host computer 1130 can be under the ownership or control of a service provider or can be operated by the service provider or on behalf of the service provider. Connections 1121 and 1122 between telecommunication network 1110 and host computer 1130 can extend directly from core network 1114 to host computer 1130 or can go via an optional intermediate network 1120. Intermediate network 1120 can be one of, or a combination of more than one of, a public, private or hosted network; intermediate network 1120, if any, can be a backbone network or the Internet; in particular, intermediate network 1120 can comprise two or more sub-networks (not shown).

The communication system of FIG. 11 as a whole enables connectivity between the connected UEs 1191, 1192 and host computer 1130. The connectivity can be described as an over-the-top (OTT) connection 1150. Host computer 1130 and the connected UEs 1191, 1192 are configured to communicate data and/or signaling via OTT connection 1150, using access network 1111, core network 1114, any intermediate network 1120 and possible further infrastructure (not shown) as intermediaries. OTT connection 1150 can be transparent in the sense that the participating communication devices through which OTT connection 1150 passes are unaware of routing of uplink and downlink communications. For example, base station 1112 may not or need not be informed about the past routing of an incoming downlink communication with data originating from host computer 1130 to be forwarded (e.g., handed over) to a connected UE 1191. Similarly, base station 1112 need not be aware of the future routing of an outgoing uplink communication originating from the UE 1191 towards the host computer 1130.

Example implementations, in accordance with an embodiment, of the UE, base station and host computer discussed in the preceding paragraphs will now be described with reference to FIG. 12. In communication system 1200, host computer 1210 comprises hardware 1215 including communication interface 1216 configured to set up and maintain a wired or wireless connection with an interface of a different communication device of communication system 1200. Host computer 1210 further comprises processing circuitry 1218, which can have storage and/or processing capabilities. In particular, processing circuitry 1218 can comprise one or more programmable processors, application-specific integrated circuits, field programmable gate arrays or combinations of these (not shown) adapted to execute instructions. Host computer 1210 further comprises software 1211, which is stored in or accessible by host computer 1210 and executable by processing circuitry 1218. Software 1211 includes host application 1212. Host application 1212 can be operable to provide a service to a remote user, such as UE 1230 connecting via OTT connection 1250 terminating at UE 1230 and host computer 1210. In providing the service to the remote user, host application 1212 can provide user data which is transmitted using OTT connection 1250.

Communication system 1200 can also include base station 1220 provided in a telecommunication system and comprising hardware 1225 enabling it to communicate with host computer 1210 and with UE 1230. Hardware 1225 can include communication interface 1226 for setting up and maintaining a wired or wireless connection with an interface of a different communication device of communication system 1200, as well as radio interface 1227 for setting up and maintaining at least wireless connection 1270 with UE 1230 located in a coverage area (not shown in FIG. 12) served by base station 1220. Communication interface 1226 can be configured to facilitate connection 1260 to host computer 1210. Connection 1260 can be direct, or it can pass through a core network (not shown in FIG. 12) of the telecommunication system and/or through one or more intermediate networks outside the telecommunication system. In the embodiment shown, hardware 1225 of base station 1220 can also include processing circuitry 1228, which can comprise one or more programmable processors, application-specific integrated circuits, field programmable gate arrays or combinations of these (not shown) adapted to execute instructions.

Base station 1220 also includes software 1221 stored internally or accessible via an external connection. For example, software 1221 can include program instructions (also referred to as a computer program product) that, when executed by processing circuitry 1228, can configure base station 1220 to perform operations corresponding to various exemplary methods (e.g., procedures) described herein.

Communication system 1200 can also include UE 1230 already referred to, whose hardware 1235 can include radio interface 1237 configured to set up and maintain wireless connection 1270 with a base station serving a coverage area in which UE 1230 is currently located. Hardware 1235 of UE 1230 can also include processing circuitry 1238, which can comprise one or more programmable processors, application-specific integrated circuits, field programmable gate arrays or combinations of these (not shown) adapted to execute instructions.

UE 1230 also includes software 1231, which is stored in or accessible by UE 1230 and executable by processing circuitry 1238. Software 1231 includes client application 1232. Client application 1232 can be operable to provide a service to a human or non-human user via UE 1230, with the support of host computer 1210. In host computer 1210, an executing host application 1212 can communicate with the executing client application 1232 via OTT connection 1250 terminating at UE 1230 and host computer 1210. In providing the service to the user, client application 1232 can receive request data from host application 1212 and provide user data in response to the request data. OTT connection 1250 can transfer both the request data and the user data. Client application 1232 can interact with the user to generate the user data that it provides. Software 1231 can also include program instructions (also referred to as a computer program product) that, when executed by processing circuitry 1238, can configure UE 1230 to perform operations corresponding to various exemplary methods (e.g., procedures) described herein.

Figure 12:
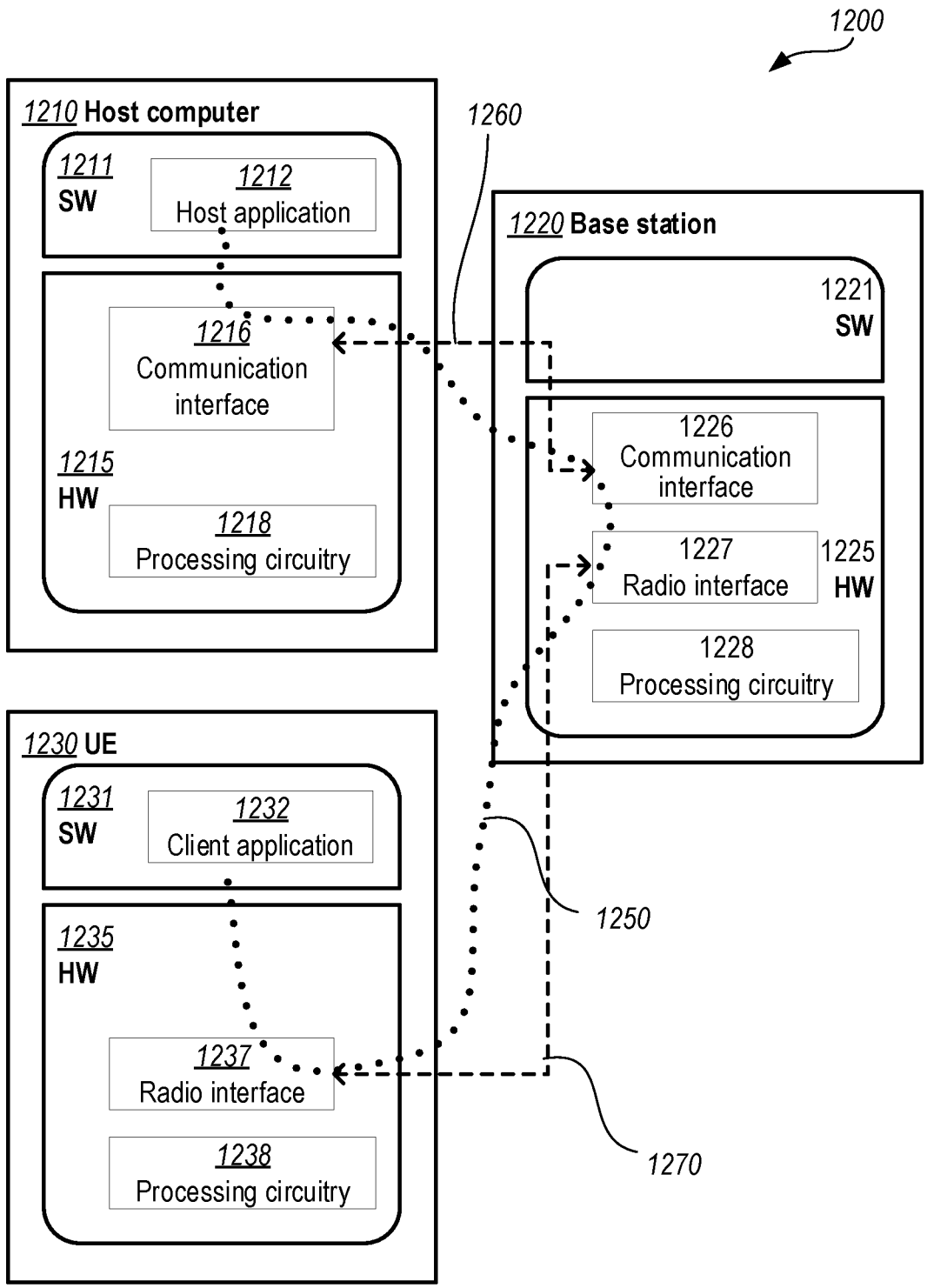

As an example, host computer 1210, base station 1220 and UE 1230 illustrated in FIG. 12 can be similar or identical to host computer 1130, one of base stations 1112*a-c*, and one of UEs 1191-1192 of FIG. 11, respectively. In other words, the inner workings of these entities can be as shown in FIG. 12 and the surrounding network topology can be that of FIG. 11.

In FIG. 12, OTT connection 1250 has been drawn abstractly to illustrate the communication between host computer 1210 and UE 1230 via base station 1220, without explicit reference to any intermediary devices and the precise routing of messages via these devices. Network infrastructure can determine the routing, which it can be configured to hide from UE 1230 or from the service provider operating host computer 1210, or both. While OTT connection 1250 is active, the network infrastructure can further take decisions by which it dynamically changes the routing (e.g., on the basis of load balancing consideration or reconfiguration of the network).

Wireless connection 1270 between UE 1230 and base station 1220 is in accordance with to the teachings of the embodiments described throughout this disclosure. One or more of the various embodiments improve the performance of OTT services provided to UE 1230 using OTT connection 1250, in which wireless connection 1270 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 1250 between host computer 1210 and UE 1230, in response to variations in the measurement results. The measurement procedure and/or the network functionality for reconfiguring OTT connection 1250 can be implemented in software 1211 and hardware 1215 of host computer 1210 or in software 1231 and hardware 1235 of UE 1230, or both. In embodiments, sensors (not shown) can be deployed in or in association with communication devices through which OTT connection 1250 passes; the sensors can participate in the measurement procedure by supplying values of the monitored quantities exemplified above, or supplying values of other physical quantities from which software 1211, 1231 can compute or estimate the monitored quantities. The reconfiguring of OTT connection 1250 can include message format, retransmission settings, preferred routing etc.; the reconfiguring need not affect base station 1220, and it can be unknown or imperceptible to base station 1220. Such procedures and functionalities can be known and practiced in the art. In certain embodiments, measurements can involve proprietary UE signaling facilitating host computer 1210's measurements of throughput, propagation times, latency and the like. The measurements can be implemented in that software 1211 and 1231 causes messages to be transmitted, in particular empty or 'dummy' messages, using OTT connection 1250 while it monitors propagation times, errors, etc.

FIG. 13 is a flowchart illustrating an exemplary method (e.g., procedure) implemented in a communication system, in accordance with one embodiment. The communication system includes a host computer, a base station and a UE which, in some exemplary embodiments, can be those described with reference to other figures herein. For simplicity of the present disclosure, only drawing references to FIG. 13 will be included in this section. In step 1310, the host computer provides user data. In substep 1311 (which can be optional) of step 1310, the host computer provides the user data by executing a host application. In step 1320, the host computer initiates a transmission carrying the user data to the UE. In step 1330 (which can be optional), the base station transmits to the UE the user data which was carried in the transmission that the host computer initiated, in accordance with the teachings of the embodiments described throughout this disclosure. In step 1340 (which can also be optional), the UE executes a client application associated with the host application executed by the host computer.

FIG. 14 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 14 will be included in this section. In step 1410 of the method, the host computer provides user data. In an optional substep (not shown) the host computer provides the user data by executing a host application. In step 1420, the host computer initiates a transmission carrying the user data to the UE. The transmission can pass via the base station, in accordance with the teachings of the embodiments described throughout this disclosure. In step 1430 (which can be optional), the UE receives the user data carried in the transmission.

FIG. 15 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 15 will be included in this section. In step 1510 (which can be optional), the UE receives input data provided by the host computer. Additionally or alternatively, in step 1520, the UE provides user data. In substep 1521 (which can be optional) of step 1520, the UE provides the user data by executing a client application. In substep 1511 (which can be optional) of step 1510, the UE executes a client application which provides the user data in reaction to the received input data provided by the host computer. In providing the user data, the executed client application can further consider user input received from the user. Regardless of the specific manner in which the user data was provided, the UE initiates, in substep 1530 (which can be optional), transmission of the user data to the host computer. In step 1540 of the method, the host computer receives the user data transmitted from the UE, in accordance with the teachings of the embodiments described throughout this disclosure.

FIG. 16 is a flowchart illustrating an exemplary method (e.g., procedure) implemented in a communication system, in accordance with one embodiment. The communication system includes a host computer, a base station and a UE which can be those described with reference to other figures herein. For simplicity of the present disclosure, only drawing references to FIG. 16 will be included in this section. In step 1610 (which can be optional), in accordance with the teachings of the embodiments described throughout this disclosure, the base station receives user data from the UE. In step 1620 (which can be optional), the base station initiates transmission of the received user data to the host computer. In step 1630 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various embodiments can be used together with one another, as well as interchangeably therewith, as should be understood by those having ordinary skill in the art.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Furthermore, functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification, drawings and exemplary embodiments thereof, can be used synonymously in certain instances, including, but not limited to, e.g., data and information. It should be understood that, while these words and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

As used herein unless expressly stated to the contrary, the phrases "at least one of" and "one or more of," followed by a conjunctive list of enumerated items (e.g., "A and B", "A, B, and C"), are intended to mean "at least one item, with each item selected from the list consisting of" the enumerated items. For example, "at least one of A and B" is intended to mean any of the following: A; B; A and B. Likewise, "one or more of A, B, and C" is intended to mean any of the following: A; B; C; A and B; B and C; A and C; A, B, and C.

As used herein unless expressly stated to the contrary, the phrase "a plurality of" followed by a conjunctive list of enumerated items (e.g., "A and B", "A, B, and C") is intended to mean "multiple items, with each item selected from the list consisting of" the enumerated items. For example, "a plurality of A and B" is intended to mean any of the following: more than one A; more than one B; or at least one A and at least one B.

Example embodiments of the techniques and apparatus described herein include, but are not limited to, the following enumerated embodiments:

E1. A method performed by a user equipment (UE) operating in a radio access network (RAN) coupled to a core network (CN), the RAN comprising a plurality of cells, the method comprising:
- receiving, via a first cell, one or more frequency selection policy parameters (P) related to at least one of the following:
  - a protocol data unit (PDU) session being established for the UE, and
  - a network slice associated with provision of the PDU session;
- based on the frequency selection policy parameters, determining one or more preferred frequencies for one or more mobility operations with respect to a second cell; and
- performing a first one of the mobility operations, with respect to the second cell, on a first one of the determined preferred frequencies.

E2. The method of embodiment E1, wherein the one or more mobility operations include any of the following:
- selecting the second cell for camping;
- accessing the second cell for data or signalling associated with the PDU session or network slice; and
- monitoring the second cell.

E3. The method of any of embodiments E1-E2, wherein the one or more frequency selection policy parameters include a first preferred frequency for at least one of the mobility operations.

E4. The method of any of embodiments E1-E3, wherein:
- the one or more frequency selection policy parameters include a first index value; and
- determining the one or more preferred frequencies includes:
  - receiving a second index value broadcast by the second cell on a particular frequency;
  - based on determining that the second index value matches the first index value, determining that the particular frequency is a preferred frequency.

E5. The method of any of embodiments E1-E4, wherein the one or more frequency selection policy parameters include:
- one or more first parameters associated with a first one of the mobility operations; and
- one or more second parameters associated with a second one of the mobility operations.

E6. The method of embodiment E5, wherein:
- the first parameters include an index value; and
- the second parameters include a preferred frequency.

E7. The method of any of embodiments E1-E6, wherein the frequency selection policy parameters are received in one of the following ways:
- from the RAN in association with a configuration of a data radio bearer (DRB) related to the PDU session and/or network slice;
- from the RAN together with an indication of the associated PDU session and/or network slice;
- from the CN, via the RAN, during establishment of the PDU session; or from the CN, via the RAN, during a re-registration procedure.

E8. The method of any of embodiments E1-E7, wherein determining one or more preferred frequencies for one or more mobility operations with respect to a second cell comprises selecting the second cell, from among a plurality of available cells, based on the second cell supporting at least one of the preferred frequencies.

E9. The method of any of embodiments E1-E8, wherein:
- the one or more frequency selection policy parameters are related to a first PDU session and/or a first network slice associated with a first data service; and
- the method further comprises:
  - receiving one or more further frequency selection policy parameters related to a second PDU session and/or a second network slice associated with a second data service;
  - based on the further frequency selection policy parameters, determining one or more further preferred frequencies for one or more mobility operations with respect to the second cell; and
  - performing one of the mobility operations, with respect to the second cell, on a first one of the determined further preferred frequencies.

E10. The method of embodiment E9, wherein:
- one of the first and second data services is enhanced mobile broadband (eMBB); and
- the other of the first and second data services is ultra-reliable low-latency communication (URLLC).

E11. A method performed by a wireless network that includes a radio access network (RAN) coupled to a core network (CN), the RAN comprising a plurality of cells, the method comprising:
- determining, for a user equipment (UE), one or more frequency selection policy parameters (P) related to one or more mobility operations, the frequency selection policy parameters being further associated with at least one of the following:
  - a protocol data unit (PDU) session being established for the UE, and
  - a network slice associated with provision of the PDU session; and sending the frequency selection policy parameters to the UE via a first cell.

E12. The method of embodiment E11, wherein the one or more mobility operations include any of the following:
- selecting a second cell for camping;
- accessing a second cell for data or signalling associated with the PDU session or network slice; and
- monitoring a second cell.

E13. The method of any of embodiments E11-E12, wherein the one or more frequency selection policy parameters include a first preferred frequency for at least one of the mobility operations.

E14. The method of any of embodiments E11-E13, wherein:
- the one or more frequency selection policy parameters include a first index value; and the method further comprises broadcasting, in the plurality of cells, respective index values indicating preferred frequencies associated with the respective cells,
wherein the first index value is broadcast in at least one of the cells.

E15. The method of any of embodiments E11-E14, wherein the one or more frequency selection policy parameters include:
one or more first parameters associated with a first one of the mobility operations; and
one or more second parameters associated with a second one of the mobility operations.

E16. The method of embodiment E15, wherein:
the first parameters include an index value; and
the second parameters include a preferred frequency.

E17. The method of any of embodiments E11-E16, wherein the frequency selection policy parameters are sent to the UE in one of the following ways:
from the RAN in association with a configuration of a data radio bearer (DRB) related to the PDU session and/or the network slice;
from the RAN together with an indication of the associated PDU session and/or the network slice;
from the CN, via the RAN, during establishment of the PDU session; or from the CN, via the RAN, during a re-registration procedure.

E18. The method of any of embodiments E11-E17, further comprising detecting an access, by the UE, to a second cell on a preferred frequency associated with the frequency selection policy parameters.

E19. The method of any of embodiments E11-E18, wherein:
the one or more frequency selection policy parameters are related to a first PDU session and/or a first network slice associated with a first data service; and
the method further comprises:
determining, for the UE, one or more further frequency selection policy parameters related to a second PDU session and/or a second network slice associated with a second data service;
sending the further frequency selection policy parameters to the UE via one of the cells.

E20. The method of embodiment E19, wherein:
one of the first and second data services is enhanced mobile broadband (eMBB); and
the other of the first and second data services is ultra-reliable low-latency communication (URLLC).

E21. A user equipment (UE) configured to operate in in a radio access network (RAN) coupled to a core network (CN), the RAN comprising a plurality of cells, the UE comprising:
radio interface circuitry configured to communicate with the RAN and the CN via the cells; and
processing circuitry operably coupled to the radio interface circuitry, whereby the processing circuitry and the radio interface circuitry are configured to perform operations corresponding to any of the methods of embodiments E1-E10.

E22. A user equipment (UE) configured to operate in in a radio access network (RAN) coupled to a core network (CN), the RAN comprising a plurality of cells, the UE being further arranged to perform operations corresponding to any of the methods of embodiments E1-E10.

E23. A non-transitory, computer-readable medium storing computer-executable instructions that, when executed by processing circuitry of a user equipment, configure the user equipment to perform operations corresponding to any of the methods of embodiments E1-E10.

E24. A computer program product comprising computer-executable instructions that, when executed by processing circuitry of a user equipment, configure the user equipment to perform operations corresponding to any of the methods of embodiments E1-E10.

E25. A wireless network that includes a radio access network (RAN) coupled to a core network (CN), the RAN comprising a plurality of cells, the wireless network comprising one or more nodes that include:
interface circuitry operable to communicate with the UE and with other nodes; and
processing circuitry operably coupled to the interface circuitry, whereby the processing circuitry and the interface circuitry are configured to perform operations corresponding to any of the methods of embodiments E11-E20.

E26. A wireless network that includes a radio access network (RAN) coupled to a core network (CN), the RAN comprising a plurality of cells, the wireless network being further arranged to perform operations corresponding to any of the methods of embodiments E11-E20.

E27. A non-transitory, computer-readable medium storing computer-executable instructions that, when executed by processing circuitry of one or more nodes in a wireless network, configure the wireless network to perform operations corresponding to any of the methods of embodiments E11-E20.

E28. A computer program product comprising computer-executable instructions that, when executed by processing circuitry of one or more nodes in a wireless network, configure the wireless network to perform operations corresponding to any of the methods of embodiments E11-E20.

The invention claimed is:

1. A method for a user equipment (UE) operating in a wireless network that includes a radio access network (RAN) coupled to a core network (CN), the wireless network employing one or both slicing and partitioning of network functionality, the method comprising:
receiving, from the RAN or the CN, one or more frequency selection policy parameters (P) specific to a protocol data unit (PDU) session for the UE;
based on the PDU session specific frequency selection policy parameters, determining one or more preferred frequencies or frequency layers for one or more mobility operations;
performing a first one of the mobility operations on a first one of the determined preferred frequencies or frequency layers; and
the one or more frequency selection policy parameters (P) indicate:
one or more index parameters, associated with the PDU session, that, together with information broadcast in a cell, gives the UE instructions on one or more of preferred or allowed camping frequency, preferred or allowed access frequency, or preferred or allowed monitoring frequency.

2. The method of claim 1, wherein the one or more mobility operations include any of the following:
camping on at least one of the cell and a frequency layer;
accessing at least one of the cell and a frequency layer for data or signaling associated with the PDU session;
monitoring the cell; and
performing the cell reselection.

3. The method of claim 1, wherein the frequency selection policy parameters include:

a first plurality of frequencies or frequency layers that are preferred for at least one of the mobility operations; and
a corresponding first plurality of priorities associated with the respective preferred frequencies or frequency layers.

4. The method of claim 1, wherein the frequency selection policy parameters include:
an index value associated with a first one of the mobility operations; and
a preferred frequency or frequency layer associated with a second one of the mobility operations.

5. The method of claim 1, wherein the frequency selection policy parameters include a first preferred frequency for camping on the cell.

6. The method of claim 5, wherein performing a first one of the mobility operations comprises:
scanning for any cells at the first preferred frequency while camping on a first cell at a first frequency that is different than the first preferred frequency; and
upon identifying a second cell at the first preferred frequency or frequency layer, performing the cell reselection to the second cell.

7. The method of claim 5, wherein:
the frequency selection policy parameters also include a plurality of second preferred frequency layers for accessing the cell;
each second preferred frequency layer is related to a different network slice;
the method further comprises receiving a paging message indicating availability of downlink data associated with a particular network slice while camping on the first preferred frequency layer in the cell;
determining one or more preferred frequencies or frequency layers comprises selecting one of the second preferred frequency layers that is related to the particular network slice; and
performing a first one of the mobility operations comprises accessing the cell by sending a random access message on the selected second preferred frequency layer.

8. The method of claim 1, wherein:
the frequency selection policy parameters include a first index value; and
determining the one or more preferred frequencies or frequency layers includes:
receiving a second index value broadcast in a particular cell on a particular frequency; and
based on determining that the second index value matches the first index value, determining that the particular frequency is a preferred frequency.

9. The method of claim 1, wherein:
the one or more frequency selection policy parameters include:
a first preferred frequency for camping on the cell in relation to an enhanced mobile broadband (eMBB) PDU session; and
a second preferred frequency for accessing the cell in relation to an ultra-reliable low-latency communication (URLLC) PDU session;
the method further comprises detecting arrival of uplink data associated with the URLLC PDU session while camping on the first preferred frequency in the cell; and
performing a first one of the mobility operations comprises accessing the cell by sending a random access message on the second preferred frequency.

10. The method of claim 1, wherein the frequency selection policy parameters are received in one of the following ways:
from the RAN in association with a configuration of a data radio bearer, DRB, related to the PDU session;
from the RAN together with an indication of the related PDU session;
from the CN via the RAN, during establishment of the related PDU session; or from the CN via the RAN, during a registration procedure or a re-registration procedure.

11. The method of claim 1, further comprising selecting a particular cell, from among a plurality of available cells, based on the particular cell supporting at least one of the preferred frequencies or frequency layers.

12. The method of claim 1, further comprising sending, to the CN or the RAN, a first indication that the UE supports PDU session-specific frequency selection policies, wherein the frequency selection policy parameters are received in response to the first indication.

13. A method for a wireless network that includes a radio access network (RAN) coupled to a core network (CN), said wireless network employing slicing and/or partitioning of network functionality the method comprising:
determining, for a user equipment (UE), one or more frequency selection policy parameters (P) related to one or more mobility operations, the frequency selection policy parameters being specific to a protocol data unit (PDU) session for the UE;
sending the PDU session specific frequency selection policy parameters to the UE; and
the one or more frequency selection policy parameters (P) indicate one or more of:
one or more index parameters, associated with the PDU session, that, together with information broadcast in a cell, gives the UE instructions on one or more of preferred or allowed camping frequency, preferred or allowed access frequency, or preferred or allowed monitoring frequency.

14. The method of claim 13, wherein the one or more mobility operations include any of the following:
camping on at least one of the cell and a frequency layer;
accessing at least one of the cell and a frequency layer for data or signaling associated with the PDU session;
monitoring the cell; and
performing the cell reselection.

15. The method of claim 13, wherein the frequency selection policy parameters include:
a first plurality of frequencies or frequency layers that are preferred for at least one of the mobility operations; and
a corresponding first plurality of priorities associated with the respective preferred frequencies or frequency layers.

16. The method of claim 13, wherein the frequency selection policy parameters include:
an index value associated with a first one of the mobility operations; and
a preferred frequency or frequency layer associated with a second one of the mobility operations.

17. The method of claim 13, wherein:
the frequency selection policy parameters include a first index value;
the method further comprises broadcasting, in a plurality of cells, respective index values indicating preferred frequencies associated with the respective cells; and
the first index value is broadcast in at least one of the cells.

18. The method of claim 13, wherein:
the one or more frequency selection policy parameters include:
a first preferred frequency for camping on the cell in relation to an enhanced mobile broadband (eMBB) PDU session; and
a second preferred frequency for accessing the cell in relation to an ultra-reliable low-latency communication (URLLC) PDU session;
the method further comprises receiving, from the UE, a random access message on the second preferred frequency.

19. The method of claim 13, wherein the frequency selection policy parameters are sent to the UE in one of the following ways:
from the RAN in association with a configuration of a data radio bearer, DRB, related to the PDU session;
from the RAN together with an indication of the related PDU session;
from the CN via the RAN, during establishment of the related PDU session;
from the CN via the RAN, during a registration procedure or a re-registration procedure.

20. The method of any claim 13, further comprising receiving, from the UE, a first indication that the UE supports PDU session-specific frequency selection policies, wherein the frequency selection policy parameters are sent in response to the first indication.

21. A user equipment (UE) configured to operate in a wireless network that includes a radio access network (RAN) coupled to a core network (CN), the wireless network employing slicing and/or partitioning of network functionality, the UE comprising:
radio interface circuitry configured to communicate with the RAN and the CN via the cells; and
processing circuitry operably coupled to the radio interface circuitry, whereby the processing circuitry and the radio interface circuitry are configured to perform operations comprising:
receiving, from the RAN or the CN, one or more frequency selection policy parameters (P) specific to a protocol data unit (PDU) session for the UE;
based on said PDU session specific frequency selection policy parameters, determining one or more preferred frequencies or frequency layers for one or more mobility operations;
performing a first one of the mobility operations on a first one of the determined preferred frequencies or frequency layers; and
the one or more frequency selection policy parameters (P) indicate one of more of:
one or more index parameters, associated with the PDU session, that, together with information broadcast in a cell, gives the UE instructions on one or more of preferred or allowed camping frequency, preferred or allowed access frequency, or preferred or allowed monitoring frequency.

22. A wireless network that includes a radio access network (RAN) coupled to a core network (CN), the wireless network employing one or both slicing and partitioning of network functionality, the wireless network comprising one or more nodes that include:
communication interface circuitry operable to communicate with user equipment (UEs) and with other nodes in the wireless network; and
processing circuitry operably coupled to the communication interface circuitry, whereby the processing circuitry and the communication interface circuitry are configured to perform operations comprising:
determining, for a user equipment (UE), one or more frequency selection policy parameters (P) related to one or more mobility operations, wherein the frequency selection policy parameters are specific to a protocol data unit (PDU) session for the UE;
sending the PDU session specific frequency selection policy parameters to the UE; and
the one or more frequency selection policy parameters (P) indicate:
one or more index parameters, associated with the PDU session, that, together with information broadcast in a cell, gives the UE instructions on one or more of preferred or allowed camping frequency, preferred or allowed access frequency, or preferred or allowed monitoring frequency.

* * * * *